(12) United States Patent
Bao et al.

(10) Patent No.: US 9,781,697 B2
(45) Date of Patent: Oct. 3, 2017

(54) LOCALIZATION USING CONVERGED PLATFORMS

(71) Applicant: Samsung Electronics Co., Ltd., Suwon-si, Gyeonggi-do (KR)

(72) Inventors: Xuan Bao, San Jose, CA (US); Yifei Jiang, Santa Clara, CA (US); Jun Yang, Milpitas, CA (US); Danny R. Bennett, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 14/311,138

(22) Filed: Jun. 20, 2014

(65) Prior Publication Data

US 2015/0373663 A1 Dec. 24, 2015

(51) Int. Cl.
*H04W 24/00* (2009.01)
*H04W 64/00* (2009.01)
*H04W 4/04* (2009.01)

(52) U.S. Cl.
CPC ............ *H04W 64/00* (2013.01); *H04W 4/04* (2013.01)

(58) Field of Classification Search
CPC ....... H04W 8/245; H04W 64/00; H04W 4/02; H04W 48/04; H04L 29/08108; G08B 3/54; G08B 13/1427; G01S 5/12; G01S 19/11; G01S 3/74; G01S 5/0252
USPC .............. 455/414.1, 418–420, 456.1–457; 370/310.2, 315–316; 340/539.11, 539.21; 342/357.21–357.48, 417, 451
See application file for complete search history.

(56) References Cited

U.S. PATENT DOCUMENTS

| | | | | |
|---|---|---|---|---|
| 5,729,826 | A | * | 3/1998 | Gavrilovich ................. 455/11.1 |
| 6,141,558 | A | * | 10/2000 | Chen .......................... 455/456.1 |
| 6,148,211 | A | * | 11/2000 | Reed et al. ................. 455/456.2 |
| 6,246,883 | B1 | * | 6/2001 | Lee ................................ 455/507 |
| 6,347,228 | B1 | * | 2/2002 | Ludden et al. ............ 455/456.5 |
| 6,677,895 | B1 | * | 1/2004 | Holt ......................... 342/357.31 |
| 6,819,919 | B1 | * | 11/2004 | Tanaka ........................ 455/414.1 |
| 7,251,223 | B1 | * | 7/2007 | Barrett et al. ................. 370/315 |
| 7,323,991 | B1 | | 1/2008 | Eckert et al. |
| 7,539,161 | B2 | | 5/2009 | Bolin et al. |

(Continued)

FOREIGN PATENT DOCUMENTS

| | | |
|---|---|---|
| EP | 1730970 | 12/2006 |
| EP | 1500949 | 2/2013 |

(Continued)

OTHER PUBLICATIONS

Della Rosa et al., "Ad Hoc Networks for Cooperative Mobile Position", Tempere University of Technology (TUT), Finland, Aalborg University (AAU), Denmark, 2014.

(Continued)

*Primary Examiner* — Steve D Agosta
(74) *Attorney, Agent, or Firm* — Beyer Law Group LLP

(57) ABSTRACT

In one aspect of the invention, a method for determining the location of a device is described. The method involves using one or more signal emitting platforms, which are capable of performing a wide variety of operations. In some embodiments, for example, the signal emitting platform is capable of physical movement. Various embodiments relate to signal emitting platforms, devices, systems, servers, computer code, methods and techniques for determining the location of a device.

20 Claims, 15 Drawing Sheets

(56) References Cited

U.S. PATENT DOCUMENTS

| | | |
|---|---|---|
| 7,956,809 B2 | 6/2011 | Haas et al. |
| 8,000,719 B1 | 8/2011 | Lambert |
| 8,098,155 B2 * | 1/2012 | Gloo et al. ............... 340/539.21 |
| 8,320,939 B1 | 11/2012 | Vincent |
| 8,364,148 B2 | 1/2013 | Dravida et al. |
| 8,433,337 B2 | 4/2013 | Chin |
| 8,452,305 B2 | 5/2013 | Brisebois et al. |
| 8,472,980 B2 | 6/2013 | Khorashadi et al. |
| 8,473,192 B2 | 6/2013 | Hannah et al. |
| 2002/0098851 A1 * | 7/2002 | Walczak et al. ............... 455/456 |
| 2004/0097229 A1 * | 5/2004 | Muhonen et al. ......... 455/435.1 |
| 2005/0250543 A1 * | 11/2005 | Thermond ................. 455/562.1 |
| 2009/0201208 A1 * | 8/2009 | McPherson et al. ......... 342/458 |
| 2010/0105409 A1 | 4/2010 | Agarwal et al. |
| 2010/0150120 A1 | 6/2010 | Schlicht et al. |
| 2010/0198814 A1 | 8/2010 | Petersen et al. |
| 2010/0317371 A1 | 12/2010 | Westerinen et al. |
| 2010/0323717 A1 | 12/2010 | Agashe et al. |
| 2011/0151898 A1 | 6/2011 | Chandra et al. |
| 2011/0313779 A1 | 12/2011 | Herzog et al. |
| 2012/0021762 A1 | 1/2012 | Garin et al. |
| 2012/0102164 A1 | 4/2012 | Gruen et al. |
| 2012/0102165 A1 | 4/2012 | Gruen et al. |
| 2012/0130625 A1 | 5/2012 | Srivastava |
| 2012/0130762 A1 | 5/2012 | Gale et al. |
| 2012/0182933 A1 | 7/2012 | Bandhakavi et al. |
| 2012/0184292 A1 | 7/2012 | Lin et al. |
| 2012/0185458 A1 | 7/2012 | Liu et al. |
| 2012/0209839 A1 | 8/2012 | Andrews et al. |
| 2012/0294532 A1 | 11/2012 | Morris |
| 2012/0303556 A1 | 11/2012 | Lin et al. |
| 2013/0019270 A1 | 1/2013 | Zellner et al. |
| 2013/0023282 A1 | 1/2013 | Lin et al. |
| 2013/0029686 A1 | 1/2013 | Moshfeghi |
| 2013/0076523 A1 | 3/2013 | Kwan et al. |
| 2013/0084882 A1 | 4/2013 | Khorashadi et al. |
| 2013/0084891 A1 | 4/2013 | Khorashadi et al. |
| 2013/0115969 A1 | 5/2013 | Holmes et al. |
| 2013/0122935 A1 | 5/2013 | Das et al. |
| 2013/0155949 A1 | 6/2013 | Pochop, Jr. et al. |
| 2013/0201365 A1 | 8/2013 | Wirola et al. |
| 2013/0204652 A1 | 8/2013 | Ritchie et al. |
| 2013/0208608 A1 | 8/2013 | Piazza et al. |
| 2013/0222369 A1 | 8/2013 | Huston et al. |
| 2013/0225167 A1 | 8/2013 | Tokgoz et al. |

FOREIGN PATENT DOCUMENTS

| | | |
|---|---|---|
| JP | 2012185047 | 9/2012 |
| WO | WO 2005/096638 | 10/2005 |
| WO | WO 2013/165391 | 11/2013 |

OTHER PUBLICATIONS

Takai et al., "Directional Virtual Carrier Sensing for Directional Antennas in Mobile Ad Hoc Networks", UCLA Computer Science Department, Scalable Network Technologies, Jun. 2002.

Nilson, "Localization using Directional Antennas and Recursive Estimation", IEEE, 2008.

International Search Report dated Sep. 22, 2015 from International Patent Application No. PCT/KR2015/005506.

Written Opinion dated Sep. 22, 2015 from International Patent Application No. PCT/KR2015/005506.

* cited by examiner

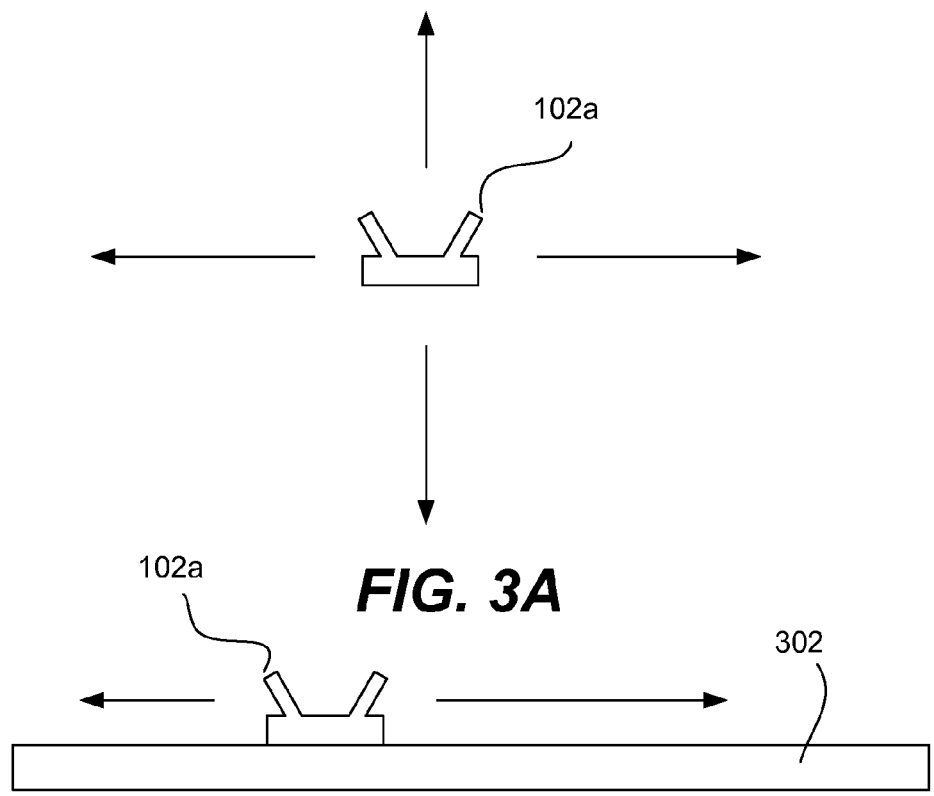
FIG. 3A
FIG. 3B
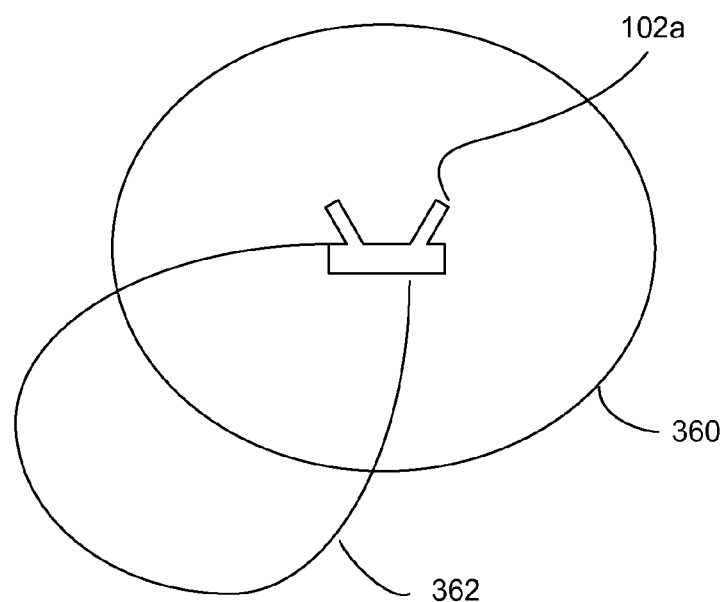
FIG. 3C

LOCALIZATION USING CONVERGED PLATFORMS

FIELD OF THE INVENTION

Various embodiments of the present invention relate to localization technologies. More specifically, various embodiments of the present invention pertain to methods, devices and arrangements for using a signal emitting platform to determine the location of a device.

BACKGROUND

There are a variety of mapping and localization technologies available for mobile devices. By way of example, some mobile phones can determine their location based on data received from Global Positioning System (GPS) satellites. The location information can then be used in a variety of different applications. In some implementations, for example, a message or reminder is sent to the mobile device based on the location of the mobile device.

GPS-based mapping systems, however, tend to be less effective in indoor environments, since the walls and ceilings of a building may block the GPS signals. There have been various efforts to develop localization systems that are effective inside of a building.

One such approach is commonly referred to as fingerprinting. In some approaches, multiple WiFi access points are set up in an area in which localization is desired. Then, the area is divided into multiple regions. At each region, test signals from the WiFi access points are received and their respective signal strengths are stored in a database. Each region in the area is thus associated with a particular signal strength pattern. If greater accuracy is desired in the localization process, a greater number of signal strength patterns must be collected.

Localization is possible once the above fingerprinting process is completed. That is, when a mobile device user enters the area and moves to a particular location, the mobile device assesses the strength of the signals received from the WiFi access points. This signal strength pattern is matched with the ones in the database to determine the location of the mobile device.

Fingerprinting, while effective in some applications, also has several disadvantages. For one, each localization area must be separately fingerprinted. This requires substantial amounts of time and effort. Additionally, signal noise (e.g., from other WiFi, FM radio or Bluetooth sources) can reduce the accuracy of the localization process.

Some other localization techniques involve measuring a signal pattern while the mobile device user is moving. Generally, such approaches require the movement of the mobile device user to match a tested movement pattern or trajectory. If the mobile device user, however, moves in an irregular manner or along a path that is different from the tested movement patterns, such localization techniques tend to be less accurate.

SUMMARY

Various embodiments of the present invention relate to localization techniques. More specifically, various embodiments of the present invention relate to the use of a signal emitting platform that is capable of physically moving and/or performing a wide variety of other operations that may change the signal properties in a controlled manner. The signal emitting platform is used to help determine the location of a particular device. In various embodiments, the device is a mobile device (the device could also be a static device with radio reception capability), such as a smartphone, a computer tablet, a laptop, a smartwatch, smart glasses or any other type of computing or wearable device.

In one aspect, a method for determining the location of a device is described. A request for localization is transmitted to a signal emitting platform. A set of one or more operations is chosen for the platform. The operations include but are not limited to moving the signal emitting device, emitting a signal, utilizing a different signal source, adjusting the signal strength, rotating a directional antenna, and turning on or off an antenna. The device receives signals from the signal emitting platform. A change in the strength of the signal is detected. The change in the strength of the signal is caused at least in part by the requested operation(s). Based on the change in the strength of the signal and the operation(s), the location of the device is determined.

In another aspect, a computer readable storage medium is described. The computer readable storage medium includes executable computer code embodied in a tangible form. The executable computer code is configured to help determine a location of a device. The executable computer code is operable to determine a first signal strength level of a signal emitted by a signal emitting platform before the signal emitting platform has moved. The executable computer code is further operable to determine a second signal strength level of a signal emitted by the signal emitting platform after the signal emitting platform has moved. The executable computer code is further operable to determine a location of a device based at least in part on a change or difference in the first and second signal strength levels and a distance that the signal emitting platform has moved. In various embodiments, the executable computer code is operable to perform the operations of the aforementioned method.

In another aspect, a signal emitting platform is described. The signal emitting platform includes a signal emitting element (which can be capable of performing one or more of the described operations), a movement element, one or more processors and one or more memory units. In various embodiments, the movement structure involves wheels, tracks, a sliding mechanism or any other suitable structure(s) for moving or changing the position of the platform. The signal emitting element may be any technology, hardware or mechanism for transmitting signals e.g., one or more antennae. Some implementations of the platform are capable of transmitting more than one type of signal, adjusting the strength of a transmitted signal and/or rotating a directional antenna. In various embodiments, the signal emitting platform is arranged to receive and process requests from an external device to perform any of the aforementioned operations.

Various embodiments of the invention pertain to a server, methods and computer code arranged to help determine the location of a device.

BRIEF DESCRIPTION OF THE DRAWINGS

The invention and the advantages thereof, may best be understood by reference to the following description taken in conjunction with the accompanying drawings in which:

FIGS. 3A and 3B are diagrammatic top and side views of a signal emitting platform in motion according to various embodiments of the present invention.

FIG. 3C is a diagrammatic top view of a signal emitting platform switching between the use of an omnidirectional and directional antenna according to a particular embodiment of the present invention.

In the drawings, like reference numerals are sometimes used to designate like structural elements. It should also be appreciated that the depictions in the figures are diagrammatic and not to scale.

DETAILED DESCRIPTION

As noted in the Background, there are various prior art techniques for determining the location of a device in an indoor environment. Each of these techniques involve determining a location of a device based on a signal strength pattern.

A weakness, however, with the aforementioned prior art techniques is that there is limited knowledge of or control over the factors that contribute to the change in the strength of the signals. In fingerprinting, for example, considerable upfront time and effort is expended to generate a signal strength map of a particular area. However, the signal strength map is only a snapshot that reflects network conditions from a particular point in time. At a later time, signal noise and interference can cause the signal strength map to be inaccurate. As noted in the Background, some localization techniques are based on the movement of a mobile device user. However, these techniques are generally less effective if the mobile device user remains stationary or moves in unexpected or irregular ways.

Various embodiments of the present invention address the above issues. The present invention pertains to the use of a signal emitting platform that can engage in one or more operations that help cause a change in the strength of an emitted signal. In some implementations, for example, the signal emitting platform can physically move, rotate and/or reposition itself. These operations can be carefully controlled and/or coordinated with multiple signal emitting platforms. The ability to control the exact operation(s) that lead to the change in the strength of the signal received by a device allows for a more accurate estimation of the location of the device. Also, since the signal emitting platforms are capable of movement, various implementations of the invention do not require the movement of the device to determine its location, as is the case with some of the aforementioned prior art approaches. Various example systems, techniques and arrangements for determining the location of a device will be described below.

Figure 1:
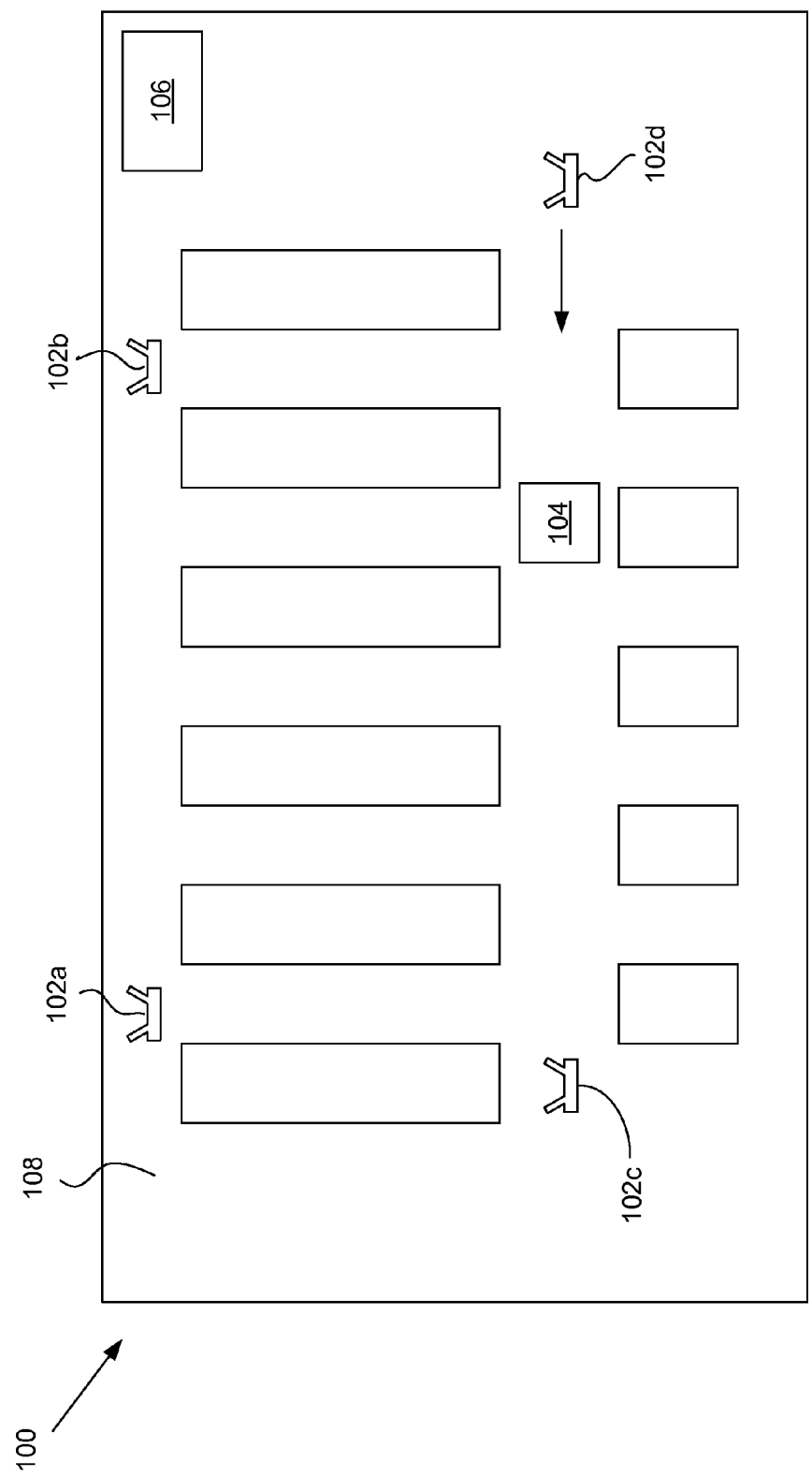
FIG. 1 is a block diagram illustrating a localization system according to a particular embodiment of the present invention.

Referring initially to FIG. 1, a system 100 for localization of a device according to a particular embodiment of the present invention will be described. The localization system 100 includes multiple signal emitting platforms 102a-102d, an optional server 106 and a device 104. All of these devices are in a localization area 108 and are connected using any suitable network (e.g., LAN, WAN, WiFi, Internet, etc.) In the illustrated embodiment, the localization area 108 is a supermarket with intersections, aisles, and shelves stocked with various products. However, the localization area 108 may be any area or environment in which the localization of a device 104 is desired.

The device 104 may be any suitable computing device, including but not limited to a mobile device, a smartphone, a smartwatch, smartglasses, a tablet computer, a laptop and any type of wearable computing device. In the illustrated embodiment, it is expected that the device 104 is portable and can be carried by a device user throughout the localization area 108.

The device 104 also includes a network interface that allows it to receive signals from the signal emitting platforms 102a-102d. The device 104 is arranged to store data indicating the strength of the signal from each signal emitting platform at various points in time. As a result, the device 104 is able to determine changes in the signal strengths of multiple signals over time, which is later used to help determine the location of the device 104.

In the illustrated embodiment, the signal emitting platforms 102a-102d are arranged to help determine a location of the device 104 while the device user is in the localization area 108. Each signal emitting platform has a variety of notable features that distinguish it from, for example, the prior art WiFi access points described in the Background. In various embodiments, for example, each signal emitting platform is not expected or required to remain stationary. Instead, the signal emitting platform is capable of physical movement. In some approaches, such movement is enabled through the use of wheels, tracks, a rail or any other suitable movement or locomotive mechanism.

Additionally, various implementations of the signal emitting platform include multiple signal sources. By way of example, a signal emitting platform 102a-102d is not necessarily limited to emitting a single type of signal and is capable of emitting any combination of Bluetooth, WiFi, FM radio, ultrasound, light or any other suitable types of signals. Some designs allow the signal emitting platform to rotate or reorient a directional antenna. In still other embodiments, the signal emitting platform can adjust the strength of the signal it emits and/or have its antenna(e) remotely activated or deactivated.

Each signal emitting platform 102a-102d is arranged to receive requests or commands from the device 104 and/or the server 106. Based on this input, the signal emitting platform performs one or more of the above operations. This causes changes in the strength of the signals received by the device 104, which is used to help determine the location of the device 104.

In various embodiments, the device 104 is arranged to collect signal strength data, send requests for one or more operations to the signal emitting platforms and determine its location. In other embodiments, there is an optional server 106 that is capable of performing these tasks. A server 106 may be useful when the location of multiple devices must be determined at the same time. The server 106 can then coordinate the operations of the signal emitting devices to help expedite the localization of multiple devices. Although the server 106 is depicted as being within the localization area 108, this need not be the case, and the server 106 can instead be at a remote location.

Once the location of the device 104 is determined, the location information may be used by the device 104 and/or the server 106 in a wide variety of ways. In various embodiments, for example, the server 106 transmits a location-based notification or alert to the device 104. The notification is then displayed to the user of the device 104. By way of example, the notification may be an advertisement (e.g., "You are in the meat department. Fresh pork is 20% off today only!), an indication of the user's location (e.g., the current location of the user is indicated on a map) or any other suitable information that is selected based on the location of the device.

Referring next to FIG. 2A, a method 200 for determining the location of a device according to a particular embodiment of the present invention will be described. In the illustrated embodiment, it is assumed that the device 104 of FIG. 1 performs the steps of the method. However, it should be appreciated that some or all of the steps can also be performed by the server 106 and/or any other suitable device.

Initially, at step 202, the device 104 receives a signal from a signal emitting platform 102a-102d. The signal may be any suitable type of wireless signal or use any suitable communications protocol, including but not limited to Bluetooth, WiFi, ultrasound signals and light-based signals.

At step 204, the device 104 obtains a first measurement of the strength of the received signal. The measurement may involve any known metric. In various embodiments, this measurement is stored at the device. Afterward, the device 104 transmits a request to the signal emitting platform 102a-102d which causes the platform to move (step 506).

The manner in which a signal emitting platform moves may vary widely, depending on the need of a particular application. FIGS. 3A and 3B illustrate two possibilities. In FIG. 3A, the signal emitting platform 102a includes a movement element (e.g., wheels, tracks, etc.) that allows the platform to freely move in almost any horizontal direction e.g., 360 degrees around the platform.

In FIG. 3B, the platform 102a is also able to physically move and change its position, but is somewhat more restricted. That is, rather than being able to remove freely without a permanent attachment to an underlying structure, the platform of FIG. 3B is attached to a rail 302 and can slide linearly along the rail. In some embodiments, the platform 102a is attached to a slot, a rail, a guide, a line, a chain or any other suitable structure that helps define the movement path for the platform. The platform 102a may move along any structure in a building, such as a wall, floor or ceiling.

This movement causes a change in the strength of the signal received by the device 104. That is, if the movement causes a signal emitting platform 102a-102d to move farther away from the device 104, the signal received by the device 104 from the platform will tend to weaken. If the movement causes the signal emitting platform 102a-102d to move closer to the device 104, then the signal received by the device 104 will tend to strengthen. In a later step, this change in the signal strength will contribute to a determination of the location of the device 104.

Generally, the movement of the platform is precisely controlled and the characteristics of the movement are obtained at the device 104. In various embodiments, for example, the device 104 requests that the signal emitting platform 102a-102d move a predetermined distance, and the platform 102a-102d moves exactly or very close to that distance. Alternatively, the platform 102a-102d may measure the distance that it has traveled and transmits this data to the device 104. In various embodiments, the device later uses this information in its localization determination (e.g., in step 216 of FIG. 2).

It should be appreciated that, in various embodiments, the signal emitting platform(s) 102a-102d are capable of a wide variety of operations, each of which can be requested at any time by the device 104 (step 208). These operations include but are not limited to the following:

1. Starting/Stopping the Transmission of a Signal

In various embodiments, each signal emitting platform 102a-102d includes a rack or set of directional antennae. Each directional antenna is mounted on the platform and is oriented or facing towards a different direction i.e., when turned on, each directional antenna emits a signal in a different direction. The localization system 100 (e.g., a server 106 and/or a device 104) can transmit a request to the platform to selectively turn on or turn off each directional antenna. By way of example, each antenna may be turned on one at a time in sequence, while the other antennae remain turned off, which allows the platform to help detect the presence of the device 104 in different regions around the platform.

In some situations, it is desirable to have only a subset of the signal emitting platforms 102a-102d generating a signal (e.g., have their antennae turned on), while the rest do not emit signals (e.g., have their antennae shut off.) For example, the device 104 may have determined that some of the signal emitting platforms are too far away from the device to be involved in the localization process. These platforms or their antennae can then be temporarily deactivated to help reduce power consumption.

Another example application is during a preliminary search phase in which the position of the device 104 is unknown and the signal emitting platforms 102a-102d are distributed evenly around the localization area so that the device must be within range of one of the platforms. In some embodiments, the antennae of the platforms are turned on one at a time in sequence while the others are turned off. This process helps identify a general region that the device is in. Once a signal from a transmitting platform is received at the device 104, the antennae for at least some of the other platforms remain turned off and one or more platforms are moved and used to determine the location of the device. An example of this approach is described later in this application in connection with FIGS. 7-13.

2. Adjusting the Strength of the Emitted Signal

Figure 3D:
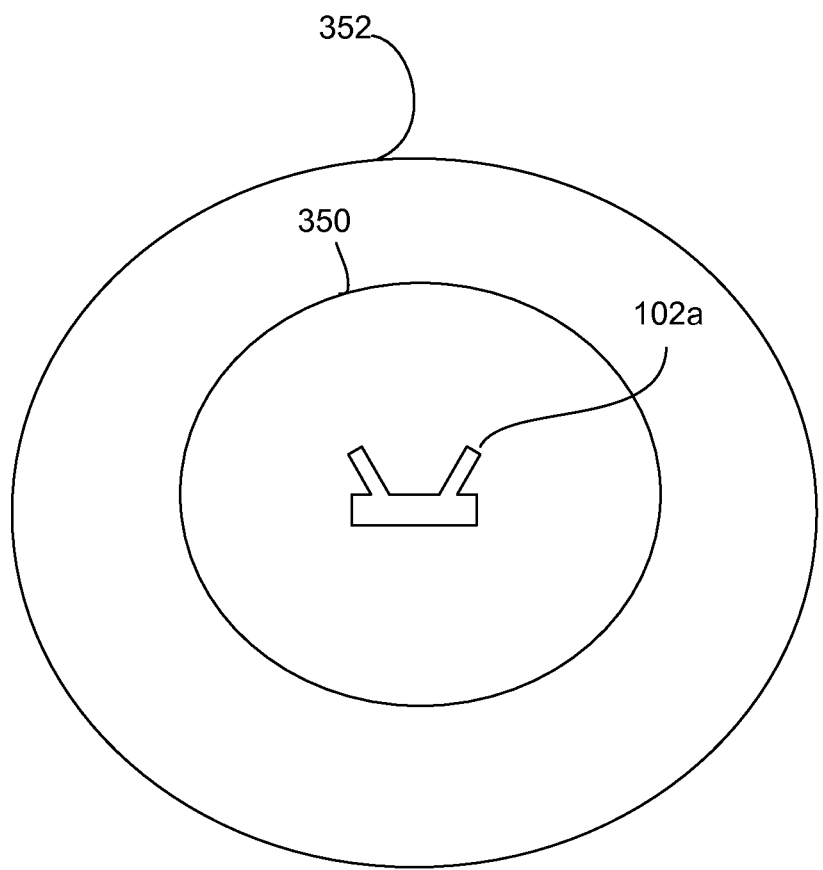
FIG. 3D is a diagrammatic top view of a signal emitting platform emitting signals at different ranges according to a particular embodiment of the present invention.

In various embodiments, each signal emitting platform 102a-102d can be remotely instructed to adjust the strength of the signal that it sends. A simple diagram illustrating this functionality is shown in FIG. 3D. FIG. 3D illustrates a signal emitting platform 102a that is able to increase and decrease the strength of its signal. In the illustrated embodiment, the range of each signal strength level is represented by smaller and larger circles that are centered around the signal emitting platform 102a. For example, if more power is applied to the antenna of the signal emitting platform, the first larger signal range 352 can be reached. If less power is applied, then a smaller, second signal range 350 is achieved. Of course, in various embodiments, the platform 102a is capable of any number of different signal strength levels and signal ranges.

Adjusting the signal strength is useful in a variety of applications. In some implementations, for example, the signal strength is adjusted based on the size and characteristics of the indoor environment in which the signal emitting platforms 102a-102d are placed. By way of example, the signal strength can be calibrated so that the the signals cover or approximate the entire area of interest (e.g., the inside of a building.) The signal strength may also have to be adjusted for different indoor environments, based on the degree to which walls and structures in the environments limit the propagation of the signals.

3. Changing the Signal Sources

Conventional WiFi access points and other wireless signal emitting devices generally are arranged to emit only one type of signal. In various embodiments, each signal emitting platform 102a-102d is arranged to emit more than one type of signal and switch between different signal types. For example, a signal emitting platform can have the capability to emit any combination of the following types of signals: WiFi, Bluetooth, ultrasound, light-based or any other suitable type of wireless signal that can be received by the device 104.

The selection and use of a particular signal type can vary based on a variety of factors. For example, different signals can have different maximum ranges and penetration characteristics. In some situations, shorter range signals can determine the location of the device 104 with greater precision. In some embodiments, for example, if the localization system 100, the device 104, and/or the server 106 determine that a particular signal emitting platform is quite close to the device 104, the platform can change to a shorter range signal type (e.g., Bluetooth, rather than WiFi), which in some circumstances can lead to more accurate localization.

4. Reorienting a Directional Antenna

Some signals that are emitted by the signal emitting platform are emitted omnidirectionally or using an omnidirectional antenna. Additionally or alternatively, the signal emitting platform 102a-102d can have the capability to transmit a signal in a particular direction using a directional antenna. An example of such a signal emitting platform 102a is illustrated in FIG. 3C. FIG. 3C illustrates a signal emitting platform 102a that includes both an omnidirectional and a directional antenna. The omnidirectional antenna emits a signal that extends equally in all horizontal directions, as represented by the circular range region 360. The signal emitting platform can also emit signals using the directional antenna, which in this particular embodiment disproportionately projects its signal in one horizontal direction more than others. The lobe shaped signal range region 362 represents the effective range of the signal emitted using the directional antenna.

In various embodiments, the localization system 100 and the signal emitting platform 102a-102d are arranged to rotate the platform and/or reorient the directional antenna so that the signal is emitted in a different direction than before. This has a variety of useful applications. In some embodiments, for example, a signal emitting platform may be at an intersection of passageways or aisles in a building. The system then determines that the device 104 might be positioned in one of the passageways. To investigate this possibility, the signal emitting platform can reorient its directional antenna down that passageway to help determine whether the device 104 is there.

Figure 2:
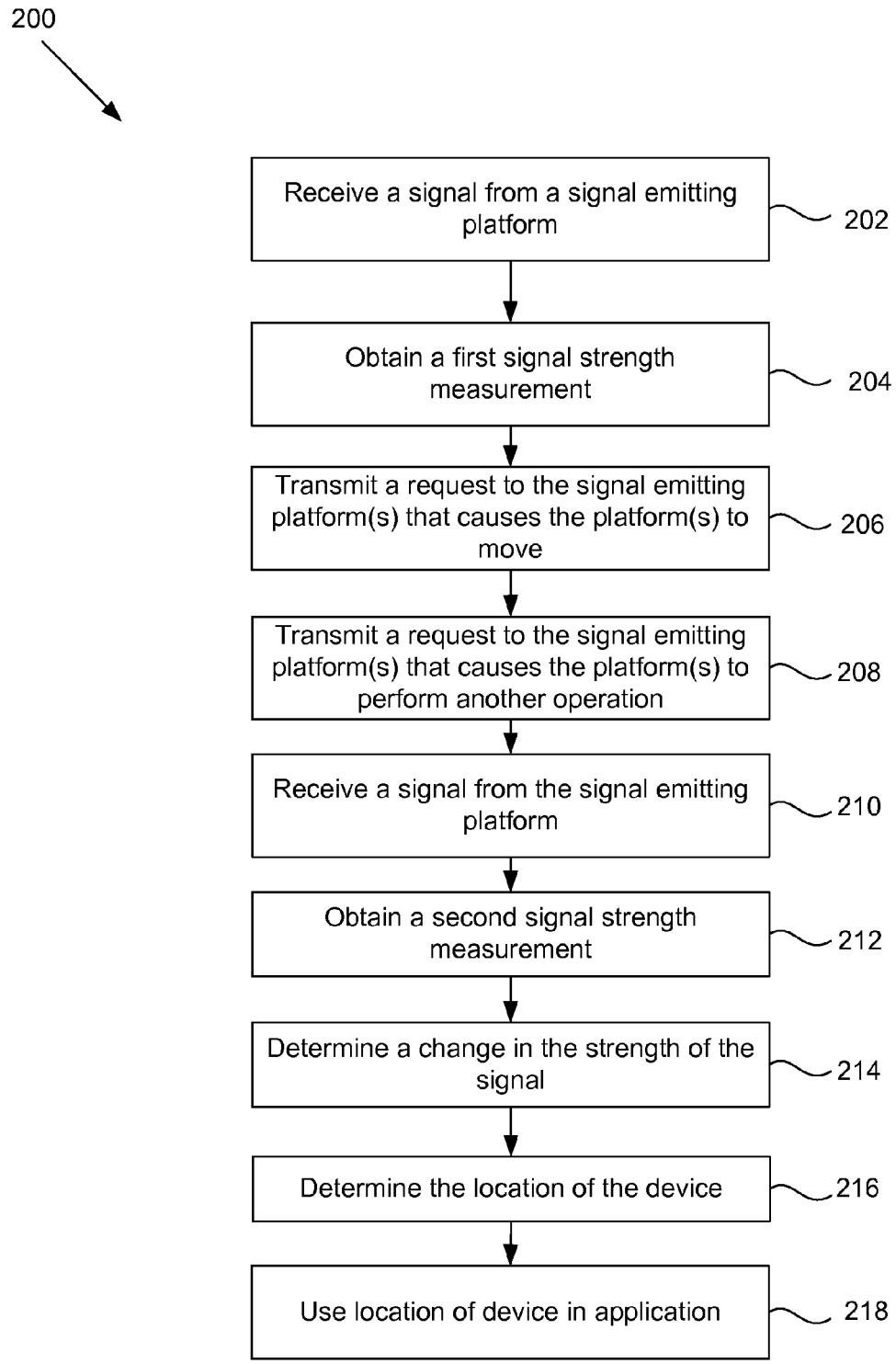
FIG. 2 is a flow diagram of a method for determining a location of a device according to a particular embodiment of the present invention.

It should be appreciated that any of the above operations may be performed at any time. For example, any combination of the above operations may be requested and performed after or before the first signal strength measurement is obtained (step 204). In some embodiments, one or more of the above operations is performed before method 200 of FIG. 2 is performed, in order to position the signal emitting platforms 102a-102d in preparation for a particular localization process. That is, before a new localization process commences, the signal emitting platforms may reposition themselves at important locations in the localization area (e.g., step 206), reorient directional antennae and/or adjust signal strength and signal sources as appropriate.

Returning to method 200 of FIG. 2, once the signal emitting platform 102a-102d has moved (step 206) and/or other operations have been performed (step 208), the signal emitting platform 102a-102d emits a signal that is received at the device 104 (step 210). The device 104 obtains a second signal strength measurement (step 212). This signal strength measurement will be different than the signal strength measured in step 204 due to the operation(s) and/or movement performed by the signal emitting platform 102a-102d.

At step 214, the device determines a change in the strength of the signal. In various embodiments, the device compares and analyzes the difference between the earlier and later signal strength measurements.

Based on the change in the strength of the signal (e.g., the difference between the first signal strength measurement obtained in step 212 and the second signal strength measurement obtained in step 204), the device determines the location of the device. Generally, this determination is also based on a knowledge of the operations that helped cause the change in the signal strength. In various embodiments, for example, the determination is based on the distance that the signal emitting platform moved in response to step 206, the type of signal that was emitted, the strength of the signal that was emitted, a change in orientation/direction by the signal emitting platform, and/or any other characteristic of an operation performed by the platform in response to steps 206 and 208.

Any known technique, algorithm or process may be used to determine the location of the device based on the above data. By way of example, any suitable wireless fading model or triangulation method may be used. One particular model may be described using the following equation:

$$|\vec{p}| = \tau \frac{P_t G_t G_r \lambda^2}{(4\pi d)^2} \quad \text{(i)}$$

The above equation generally describes signal loss over a non-line of sight path with consideration of reflection. In the equation, $\vec{p}$ refers to the power of the signal, $P_t$ is the transmission power, $G_t$ is the transmission gain, $G_r$ is the receiver gain, $\lambda$ represents antenna properties and d is the distance between the emitting source (e.g., the signal emitting platform) and the receiver (e.g., the device.) Given knowledge of the change in signal strength (e.g., as determined in step 214), the current location of the signal emitting platform and the distance that the signal emitting platform has moved in response to step 206, the distance between the platform and the device can be extrapolated using the above formula.

In various embodiments, it is desirable to isolate the line-of-sight signal from reflected signals. The equation below formulates the collectively observed signal strength from multiple signal paths.

$$P(x, \lambda_j) = \left| \sum_{i=1}^{n} \vec{p}_i \right| \quad \text{(ii)}$$

-continued $$= \left[\left(\sum_{i=1}^{n} c\lambda_j^2 d_i^{-2}\sin(d_i\lambda_j^{-1})\right)^2 + \left(\sum_{i=1}^{n} c\lambda_j^2 d_i^{-2}\cos(d_i\lambda_j^{-1})\right)^2\right]^{1/2}$$

In the above equation, P is power, λ is the wavelength and c is a coefficient representing transmitter/receiver properties. Once the line-of-sight signal is isolated using the above equation (ii), equation (i) can be used to help determine the approximate location of the device 104.

Although various formulas are described above, it should be noted that any formula, algorithm or technique may be used to determine the approximate location of the device based on the operations described in steps 206/208 and the change in the signal strength described in steps 214 and 216. In some embodiments, additional data is obtained from the device, the signal emitting platform(s) and/or the server to help determine the location of the device. Some implementations involve using sensor data received from the device 104 to help determine the location of the device. Such sensor data can include but is not limited to data indicating a direction or speed that the device is moving, data indicating whether the device is stationary or in motion, any data obtained using a motion sensor or accelerometer on the device, etc. In embodiments in which the server 106 is performing step 214, the server 106 can optionally request and receive such data from the device 104. The server 106 then uses the data to help determine the location of the device 104.

Once the location of the device is determined, the location information may be used in a wide variety of applications (step 218). In various implementations, for example, the location information is used to provide advertisements, notifications or other location-related messages to the user of the device. Some embodiments involve the device transmitting the location information to a server. The server then associates the location with a particular company, product, service or offering. The server then transmits an advertisement or notification to the device for display at the device.

One simple example may be described as follows. Assume that the device and the device user are determined to be in a particular region of a supermarket. The device transmits this location information to a server. The server determines that the identified region in the supermarket is in the frozen dessert section of the supermarket. Based on this information, the server transmits a message to the device that is displayed to the user, which informs him or her of a special deal on various ice cream products.

It should be appreciated that the above method 200 may involve the sending of signals and the performance of operations by one or multiple signal emitting platforms 102a-102d. That is, multiple platforms could send signals (e.g., as described in steps 202 and 210) and perform requested operations (e.g., as described in steps 206 and 208), possibly concurrently. In such implementations, the device 104 receives signals from each transmitting platform (e.g., as described in step 202 and 210), sends requests for various, possibly different operations to the platforms (e.g., as described in steps 206 and 208) and detects changes in the strength of signals received from each platform (e.g., as described in step 204, 212 and 214) that were caused in part by the operations. The determination of the location of the device is then based at least in part on multiple operations by multiple platforms and changes in the strength of signals received from multiple platforms. In some applications, the use of multiple platforms allows for a more precise determination of the location of the device (e.g., through the use of methods such as triangulation.)

Figure 4A:
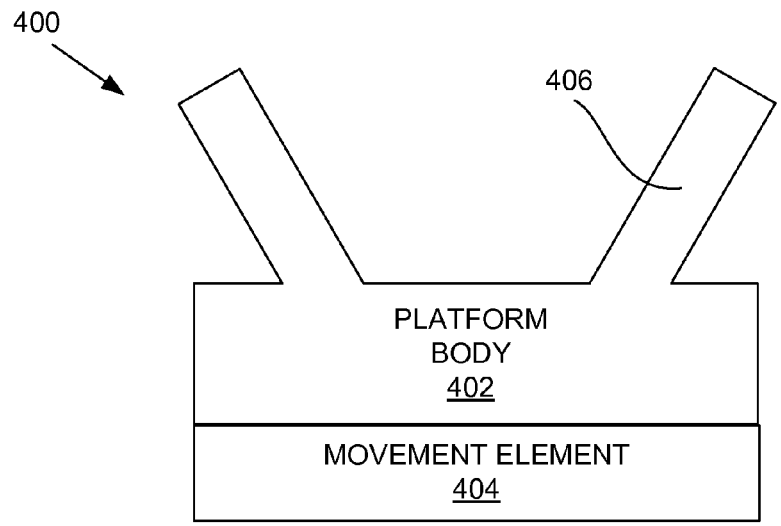
FIGS. 4A and 4B are block diagrams of a signal emitting platform according to a particular embodiment of the present invention.
Figure 4B:
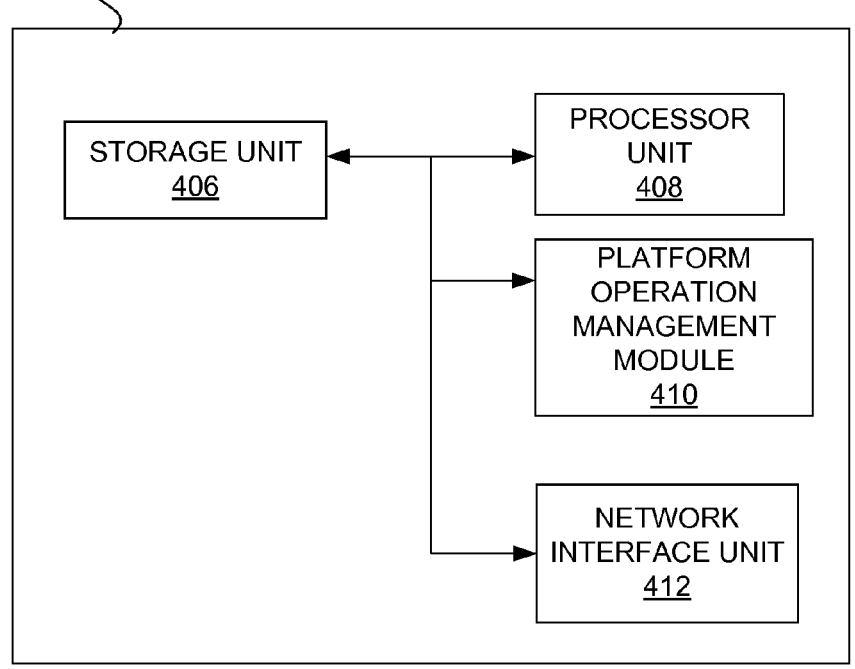

Referring next to FIGS. 4A and 4B, a signal emitting platform 400 according to a particular embodiment of the present invention will be described. FIG. 4A provides an external view of an example signal emitting platform 400. FIG. 4B illustrates various hardware and/or software components in the platform 400. The platform 400 may be any signal emitting platform described in this application, such as one of the platforms 102a-102d of FIG. 1.

Referring to FIG. 4A, the signal emitting platform 40 includes a platform body 402, a signal emitting element 406 and a movement element 404. In the illustrated embodiment, the platform body 402 includes and/or physically supports the components illustrated in FIG. 4B. Some implementations of the platform body 402 involve a housing made of any suitable material (e.g., metal, plastic, polycarbonate, etc.), which encases or covers the aforementioned components.

The signal emitting element 406 is any mechanism, device or structure that is arranged to help transmit signals. In various embodiments, for example, the signal emitting structure 406 includes one or more antennae arranged to emit one or more types of signals e.g., WiFi, Bluetooth, FM radio, any radio signal, etc. Some implementations of the signal emitting element 406 involve a light transmitter for transmitting light signals or an ultrasound transmitter for transmitting ultrasound signals. In still other embodiments, the signal emitting element 406 allows the platform to function as a movable WiFi hotspot or access point. In the illustrated embodiment, the signal emitting element 406 takes the form of antennae that protrude from the housing element 402, although this is not a requirement and the signal emitting element may take any form or be positioned on any part of the signal emitting platform 400. In various implementations, the signal emitting platform 406 includes a set or rack of multiple directional antennae. Based on a request from the localization system 100 (e.g., from a device 104 and/or a server 106), the signal emitting platform 406 is capable of turning on or off each directional antennae in the rack in sequence or at any time.

Some implementations of the signal emitting element 406 include a directional and/or omnidirectional antennae. In various embodiments, one or more directional antennae are positioned on a rotatable base or platform. As a result, the signal emitting platform 400 is able to rotate the directional antenna or change the direction that the antenna is oriented, possibly without physically moving the rest of the housing element 402 and/or the movement element 404.

The signal emitting platform 400 also includes a movement element 404. The movement element 404 is any mechanical structure or mechanism that enables the signal emitting platform 400 to physically move and adjust its physical position. By way of the example, the movement element 404 may include one or more wheels or tracks that allow the platform to roll or travel across a surface. In some embodiments, the movement element 404 includes an engagement mechanism that engages a rail, slot, chain, line or other structure that is positioned on a floor or wall of a building. The engagement mechanism allows the platform 400 to slide or move along a predetermined path. Any other known, suitable locomotive or transport technology may also be used in the movement element 404.

The movement element 404 may be positioned on any part of the signal emitting platform 400. In some embodiments, for example, the movement element includes wheels or tracks that are positioned at a bottom surface or bottom end of the signal emitting platform 400. The wheels or tracks physically support the platform and allow the platform 400 to roll or move along the ground. In the illustrated embodiment, the platform body 402 rests upon and/or is physically supported by the movement element 404 or a base portion that is attached with the movement element 404. However, it should be appreciated that the architecture and design of the signal emitting platform can take many different forms and may differ substantially from the example described above.

Some implementations of the signal emitting platform 400 include an interface for receiving electrical power from an external source or cable. Alternatively or additionally, the platform 400 includes an electrical battery, which allows the platform to run for a period of time without requiring connection to an external power supply. In some embodiments, the platform 400 includes a motor that applies torque or power to the movement element 404. The platform may include any suitable power source for providing power to the internal electronics and movement element 404 of the platform.

Referring next to FIG. 4B, various components of the signal emitting platform 400 according to a particular embodiment of the present invention will be described. Generally, the illustrated components are contained in the platform body 402, although this is not a requirement and they also may be positioned anywhere on the platform 400. The signal emitting platform 400 includes a storage unit 406, a processor unit 408, a platform operation management module 410 and a network interface unit 412.

The network interface unit 412 includes any hardware or software suitable for allowing the signal emitting platform 400 to communicate with the device 104, server 106 and/or other external devices. In various embodiments, the network interface unit 412 processes and generates one or more different types of signals as described in connection with steps 202 and 210 of FIG. 2. Generally, such signals are emitted through the signal emitting element 406 and transmitted to the device 104. The network interface unit 412 is arranged to exchange data with the device 104 and/or server 106 using any suitable network (e.g., LAN, Internet, WiFi, etc.) or communications protocol.

The storage unit 406 is any hardware or suitable for storing data and executable computer code. The storage unit 406 includes but is not limited to a hard drive, flash drive, non-volatile memory, volatile memory or any other type of computer readable storage medium. Any operation or method described in this application (e.g., method 200 of FIG. 2) for the signal emitting platform 102a-102d may be stored in the form of executable computer code or computer readable instructions in the storage unit 406. The execution of the computer code or instructions by the processor unit (which includes one or more processors) causes the signal emitting platform 400 to perform the aforementioned operation(s).

The platform operation management module 410 is any hardware or software that is arranged to manage, process and act upon communications with the device 104 and/or server 106. In some embodiments, the module 410 is a software module stored in the storage unit 406. If a request for a particular operation (e.g., moving the platform, changing the signal type, turning on/off an antenna, changing the orientation of a directional antenna, etc.) is received from the device 104 through the network interface unit 412, the platform operation management module 410 transmits a control signal to the movement element 404, antennae 406 or any other suitable component of the platform 400 to perform the requested operation. In various embodiments, the platform operation management module 410 is also arranged to send requested information or data to the device 104 and/or server 106. By way of example, the unit 410 can provide information regarding characteristics of the platform and/or a recently performed operation (e.g., the amount of distance traveled by the platform 400 in the most recent operation, etc.) upon request from a device 104 and/or server 106.

Figure 5:
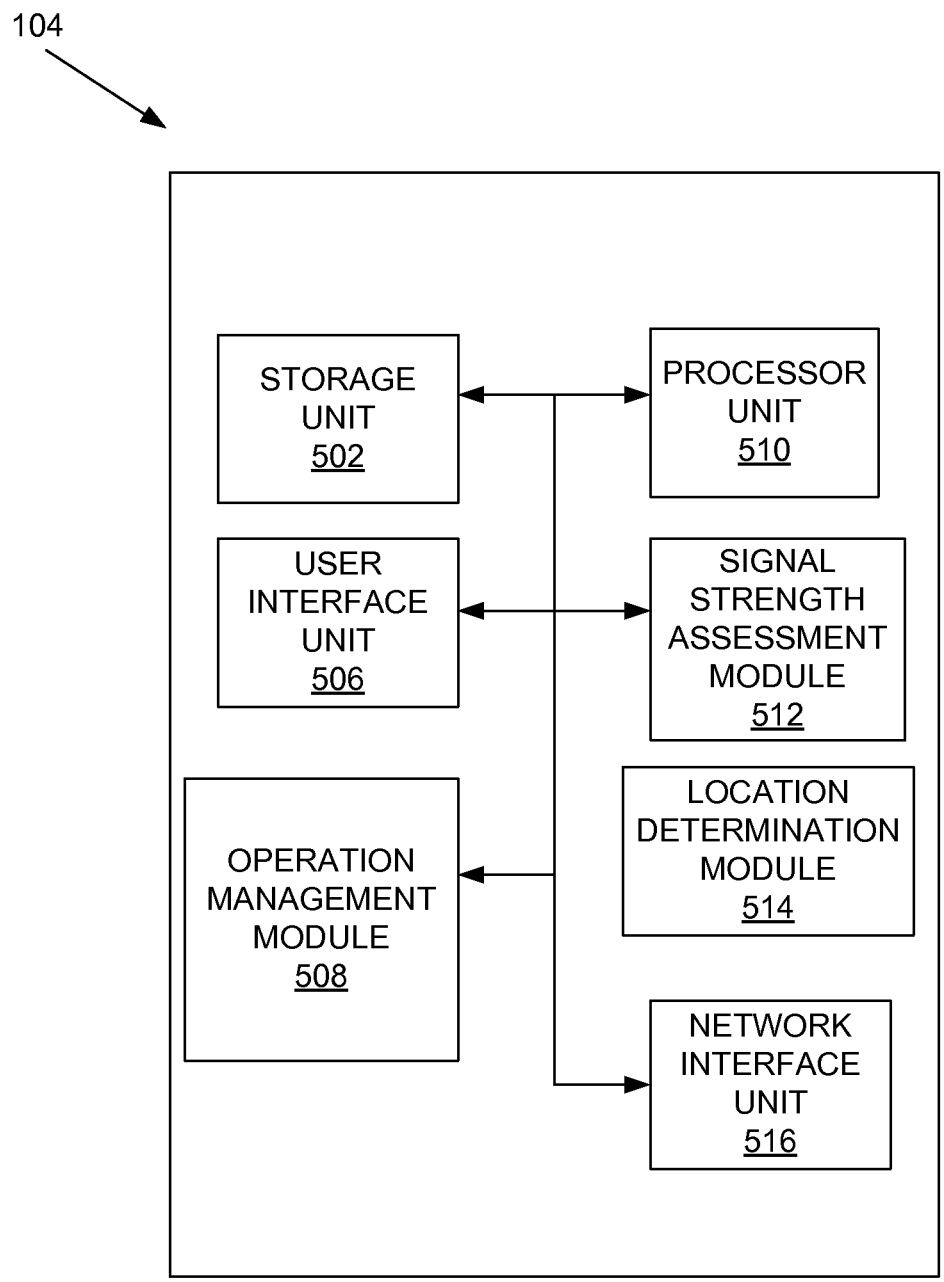
FIG. 5 is a block diagram of a device according to a particular embodiment of the present invention.

Referring next to FIG. 5, a device 104 according to a particular embodiment of the present invention will be described. The device includes a processor unit 510 that includes one or more processors, a storage unit 502, a user interface unit 506, a signal strength assessment module 512, a operation management module 508 and a network interface unit 516. The device 104 may be any suitable computing device (e.g., the device 104 of FIG. 1) In some embodiments, the device is a mobile device, including but not limited to a smartphone, computer tablet, computer glasses, smartwatch and/or any other type of wearable technology.

The network interface unit 516 includes any hardware or software suitable for enabling the signal emitting platform 102a-102d to communicate with the signal emitting platform 102a-102d, server 106 and/or other external devices. For example, the network interface unit 516 is arranged to help transmit requests for particular operations (e.g., a request for a signal emitting platform to move) to one or more signal emitting platforms. The network interface unit 516 is also arranged to receive and process any signals, commands or data from the signal emitting platform(s) and/or server 106. In some embodiments, for example, the network interface unit is arranged to receive Bluetooth, WiFi, ultrasound signals, light-based signals and/or any other type of signal that could be emitted by the signal emitting platforms. The network interface unit is arranged to transmit and receive data using any suitable network (e.g., LAN, Internet, etc.) or known communications protocol.

The storage unit 502 is any hardware or suitable for storing data or executable computer code. The storage unit 502 can include but is not limited to a hard drive, flash drive, non-volatile memory, volatile memory or any other type of computer readable storage medium. Any operation or method for the device 104 that is described in this application (e.g., method 200 of FIG. 2) may be stored in the form of executable computer code or instructions in the storage unit 502. The execution of the computer code or instructions by the processor unit 510 (which includes one or more processors) causes the device 104 to perform any of the aforementioned operations or methods.

The signal strength assessment module 512 is any software or hardware arranged to assess the strength of one or more signals received from one or more signal emitting platforms through the network interface unit 516. In various embodiments, the signal strength data is stored for later analysis. The signal strength assessment performed by the signal strength analysis module 512 may be used, for example, to determine a change in the strength of the signal over time or after a particular operation is performed by a signal emitting platform (e.g., as described in connection with steps 202, 204, 210, 212, 214 and 216 of FIG. 2.) In some embodiments, the signal strength assessment module is a software module that is stored in the storage unit 502.

The operation management module 508 is any software or hardware arranged to help select operations that, when executed by one or more signal emitting platforms, would help determine the location of the device 104. In various embodiments, for example, the operation management module 508 stores data indicating the status of each of the signal emitting platforms (e.g., a location of each platform, a direction that each platform is facing, whether an antenna of each platform is on or off, what type of signal each platform is emitting, etc.) Based on this status information, the operation management unit determines or selects one or more operations that should be performed by one or more signal emitting platforms. The module 508 then transmits requests for the selected operations to the signal emitting platform(s) and/or the server (e.g., as described in connection with step 206 of FIG. 2) through the network interface unit 516. In various embodiments, the operation management module 508 is a software module that is stored in the storage unit 502.

The location determination module 514 is any software or hardware arranged to help determine the location of the device 104 based on signal strength data and the operation(s) performed by the signal emitting platform(s) 102a-102d. In various embodiments, the location determination module 514 determines an approximate location of the device 104 based on the signal strength data received from the signal strength assessment module 512 and the operations requested through the operation management module 508. Generally, any operation described in connection with step 216 of FIG. 2 may be implemented at least in part by the location determination module 514. In various embodiments, the location determination module is a software module that is stored in the storage unit 502.

The user interface unit 506 is any hardware or software for presenting an interactive user interface to the user of the device. In various embodiments, the user interface unit includes but is not limited to a touch-sensitive (capacitive) screen, a video display, an e-ink display, an LCD screen, an OLED screen and a heads up display. Some implementations involve displaying an advertisement or alert at the user interface unit 506 after the location of the device 104 is determined by the location determination module 514. The selection and display of the alert or advertisement is based at least in part on the location of the device 104, as previously discussed in connection with step 218 of FIG. 2.

Figure 6:
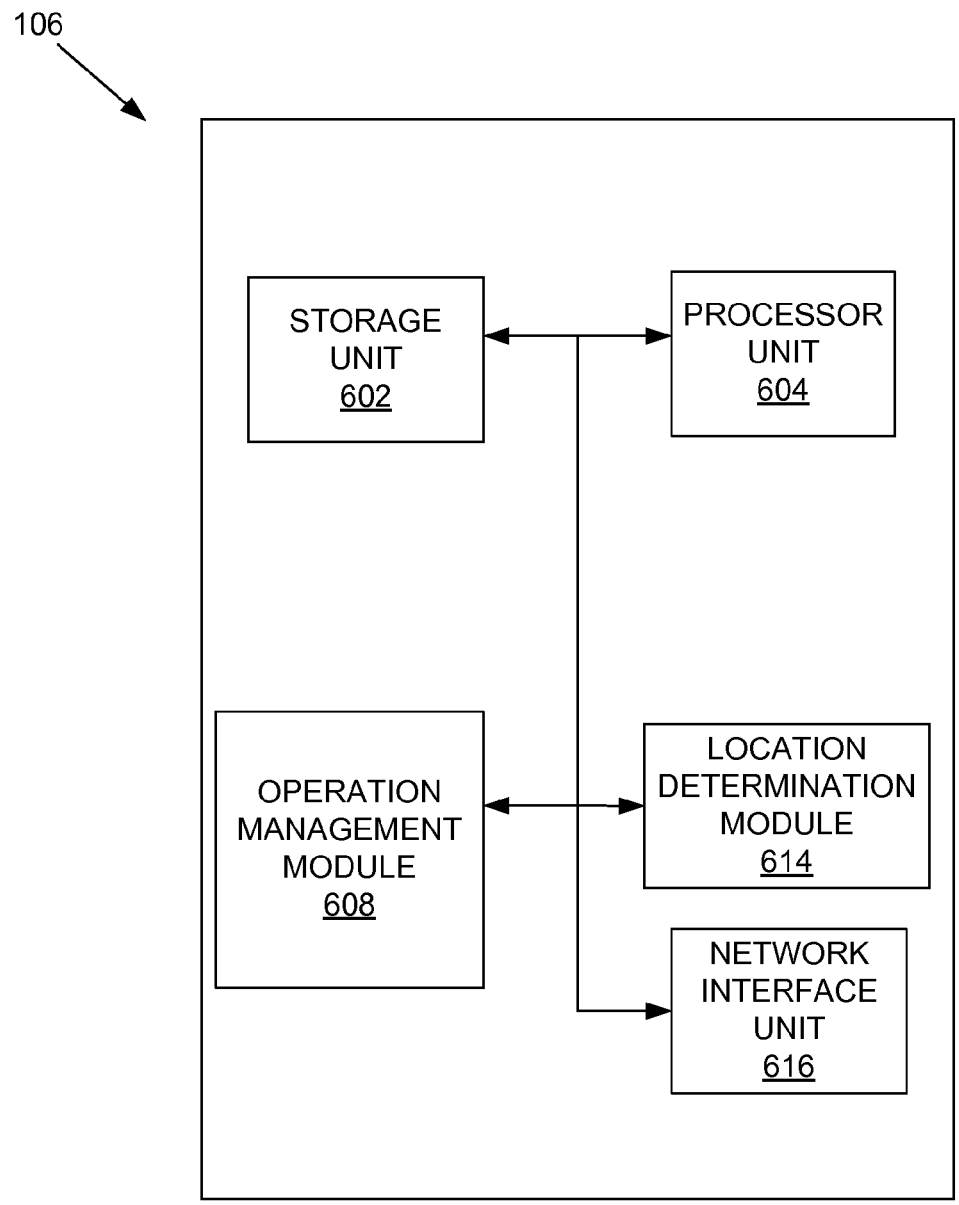
FIG. 6 is a block diagram of a server according to a particular embodiment of the present invention.

Referring next to FIG. 6, a server 106 according to a particular embodiment of the present invention will be described. The server 106 includes a processor unit 604 that includes one or more processors, a storage unit 602, a location determination module 614, an operation management module 608 and a network interface unit 616. The server 106 may be, for example, the server 106 illustrated in FIG. 1.

In some embodiments, the server 106, rather than the device 104, coordinates the operations performed by the signal emitting platforms and/or determines the location of the device 104. By way of example, the server can play this role when the presence of multiple devices are expected in the localization area 108 and the operations of the signal emitting devices 102a-102d must be coordinated to efficiently determine the location of multiple devices at the same time.

Generally, each of the components in FIG. 6 (storage unit 602, processor unit 604, operation management module 608, location determination module 614, network interface unit 616) function in the same or a very similar manner to their counterparts (storage unit 502, processor unit 504, operation management module 508, location determination module 514, network interface unit 516) in the device 104 illustrated in FIG. 5. Put another way, the server 106 is arranged to perform any of the operations described in method 200 of FIG. 2 that were attributed to the device 104. Possible exceptions are the receiving of signals from the signal emitting device(s) and/or the obtaining of signal strength measurements (e.g., steps 204 and 212 of FIG. 2), which are generally performed by the device 104. In various embodiments, the server 106 requests and/or receives these measurements from the device 104 and then uses the measurements to determine the location of the device (e.g., steps 214 and 216 of FIG. 2.)

Referring next to FIGS. 7-13, an example process for determining the location of a device in a localization area 708 will be described. It should be appreciated that this example is provided only for illustrative purposes and should not be considered to be limiting in any way. This example process provides only one, simplified example of how the operations of multiple signal emitting platforms 702a-702e can be coordinated to help determine the location of a device.

In this example, there are five signal emitting platforms 702a-702e in a localization area 708, which in this example is a supermarket. The localization area 708 includes multiple aisles, intersections and shelves offering various types of products. A mobile device 704, which in this example is a smartphone, is held by a user in the localization area 708 as the user is browsing the supermarket. A server 706 is connected to the signal emitting platforms 702a-702e and the device 708 via a suitable network (e.g., WiFi.) The signal emitting platforms 702a-702e, device 704 and server 706 may have any of the features described in this application in connection with signal emitting platforms 102a-102d/500, device 104 and server 106.

Figure 7:
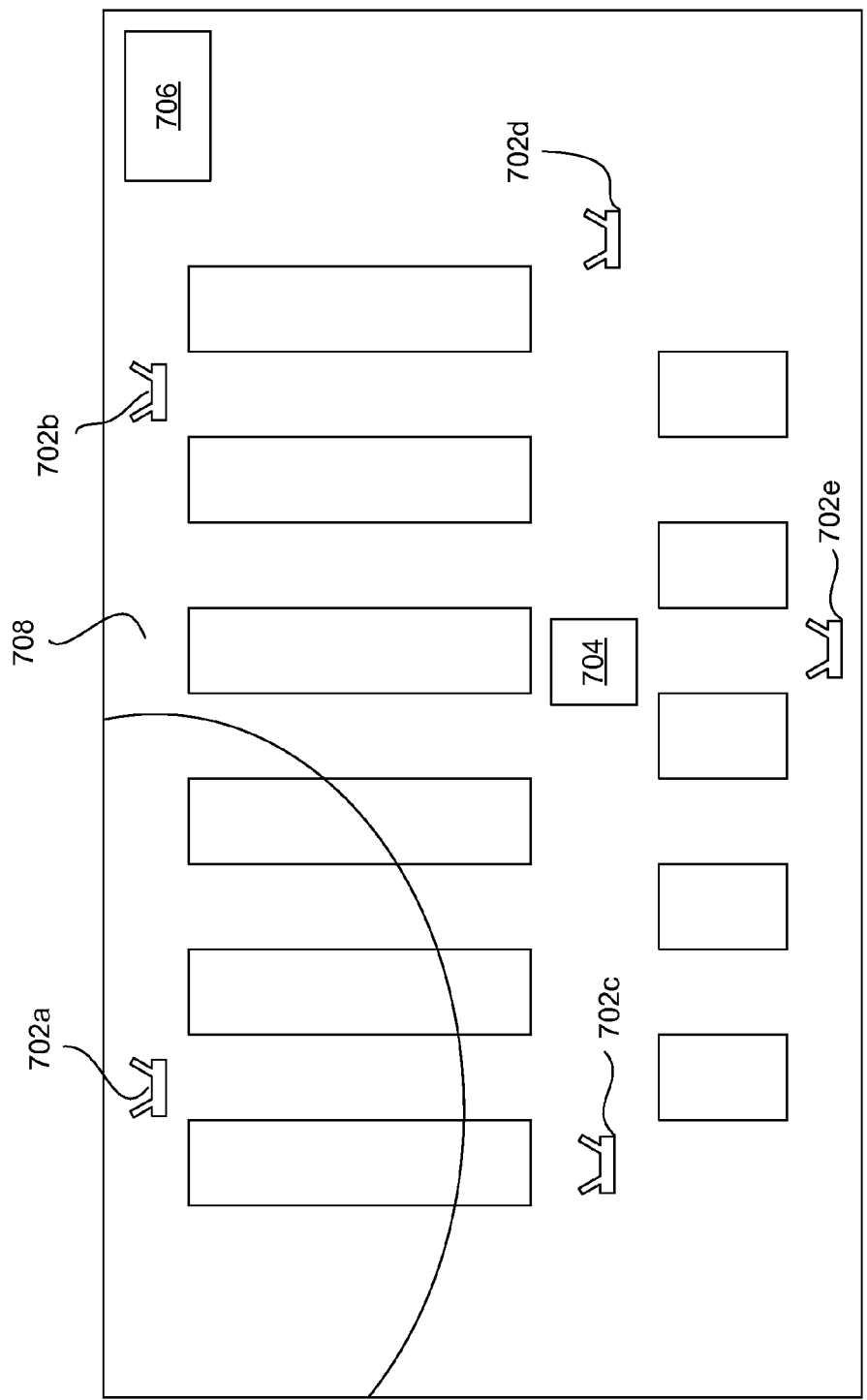
FIGS. 7-13 are block diagrams illustrating example operations performed in a localization system according to a particular embodiment of the present invention.

Referring initially to FIG. 7, the smartphone sends a signal to the server 706, indicating its presence in the localization area 708. In response, the server 706 transmits a command to all of the signal emitting platforms 702a-702e, which causes the signal emitting platforms to perform the following actions: (1) turn off antennae suitable for emitting signals; and (2) reposition themselves at designated locations in the localization area. The signal emitting platforms thus physically move to various intersections in the localization area (e.g., using wheels, tracks, rails or any other structure or mechanism that can help the platform change its location.) The server 706 stores the location of each of the platforms.

The server 706 then transmits another command to the signal emitting platforms 702a-702e, which causes the platforms to emit a suitable signal (e.g. WiFi) using an omnidirectional antenna one at a time, in sequence, to help determine a general location of the device 704. The command further causes the platforms to adjust the effective range of their signals such that the combined signal range of all the platforms completely or almost completely covers the localization area.

First signal emitting platform 702a uses an omnidirectional antenna to emit a signal first, while the antennae of the other signal emitting platforms 702a-702e remain deactivated. While the signal is being transmitted, the device 704 determines whether the signal is received. As shown in FIG. 7, the device 704 is out of the range of the signal emitted by the first signal emitting platform 702a, so the device 704 does not receive a signal (e.g., the strength of the signal received by the device 704 is zero.) The device 704 transmits this signal strength data to the server 706.

Figure 8:
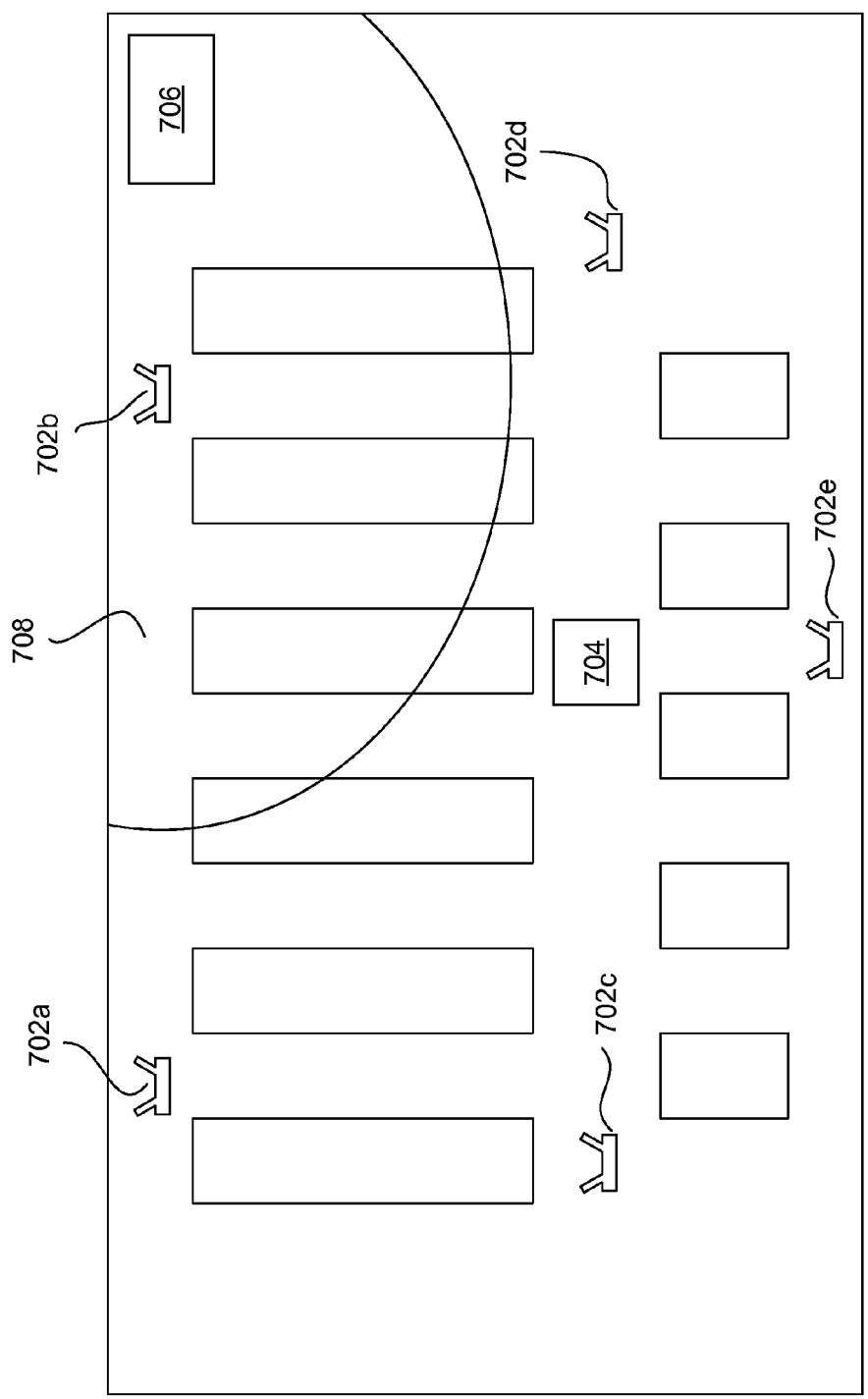

Since the signal emitted by the first signal emitting platform 702a was not received by the device, the server commands the next signal emitting platform (i.e., second signal emitting platform 702b) to emit a signal. The server further sends a command to the first signal emitting platform 702a, which causes the platform to stop sending a signal and/or turn off its antenna. As shown in FIG. 8, the second signal emitting platform 702b then sends a signal, while the other signal emitting platforms do not send signals. Again, the device 704 is out of range of the signal. The device 704 sends a message to the server 704, indicating that no signal was received while the second signal emitting platform 702b was transmitting.

Figure 9:
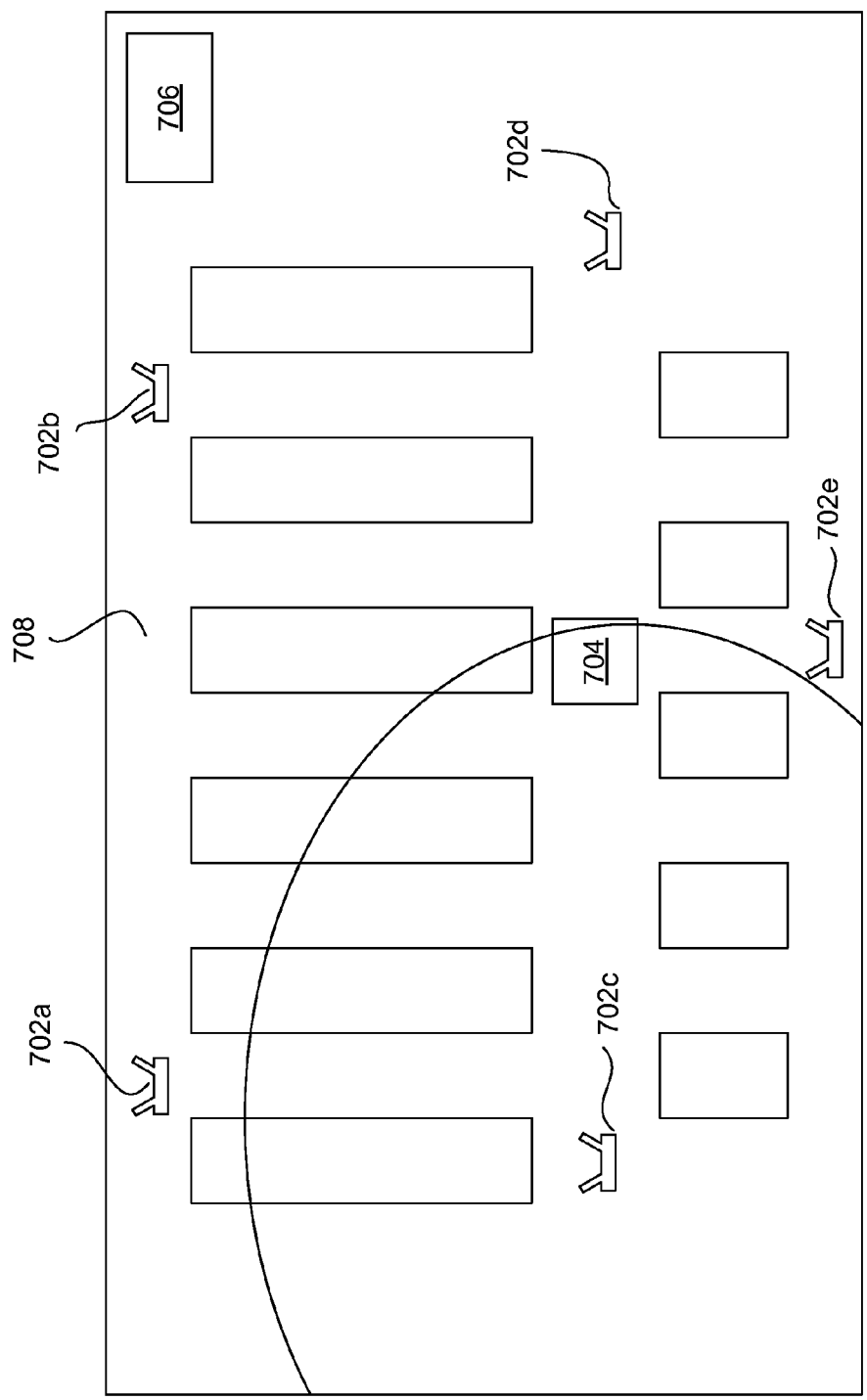

Afterward, the third signal emitting platform 702c transmits a signal, as shown in FIG. 9. The other signal emitting platforms 702a, 702b and 702d-702e do not send signals while the third signal emitting platform is transmitting. This time, however, the device 704 is within range of the signal. That is, the strength of the signal emitted by the third signal emitting platform 702c is received at the device 704 i.e., the strength of the signal is non-zero. The device 702c transmits this signal strength data to the server 706.

Figure 10:
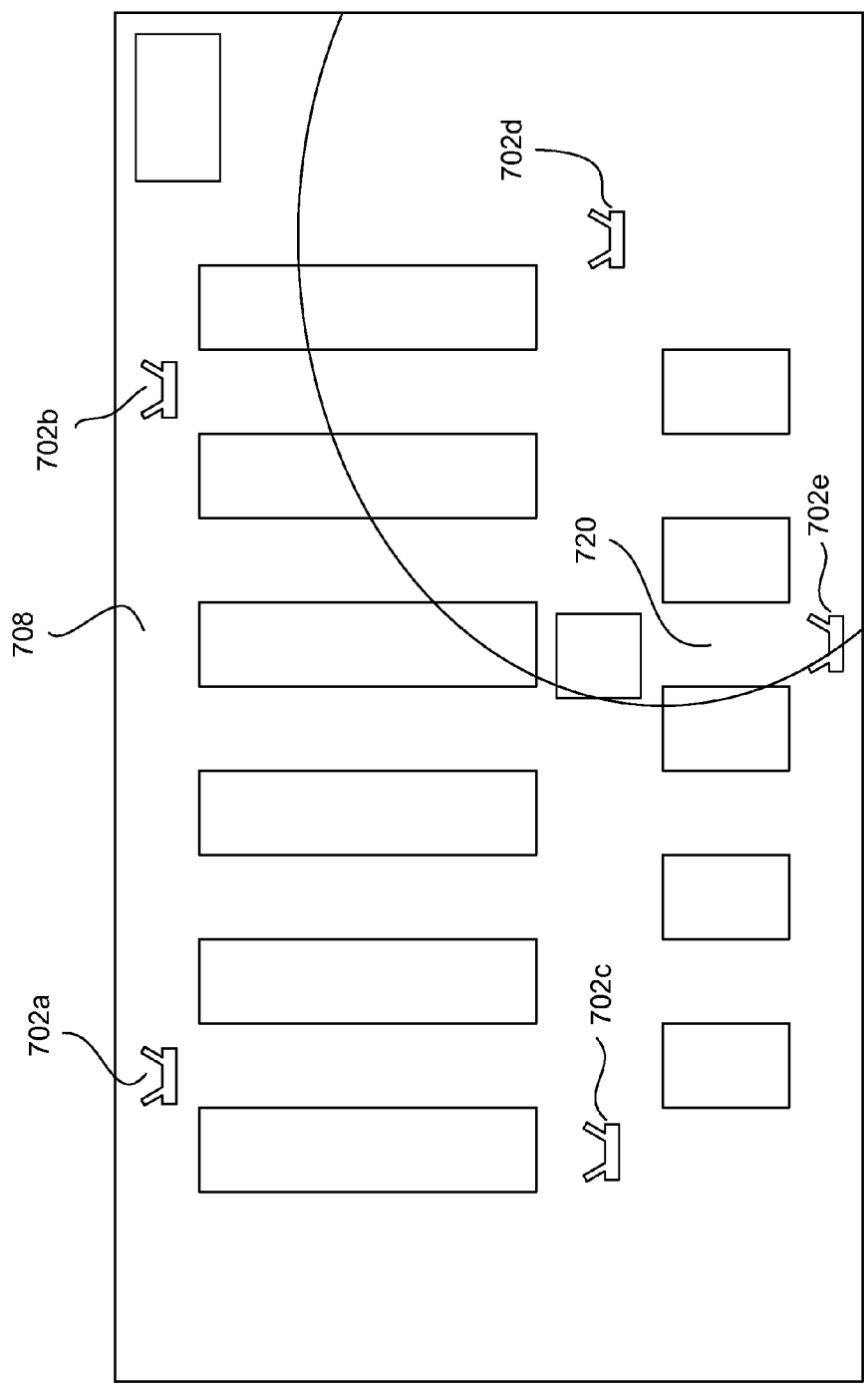

The server then transmits a command to the fourth signal emitting platform 702d, as shown in FIG. 10, which causes the platform 702d to also emit a signal. The other platforms do not send a signal during this time. Again, the device 704 is in range of the emitted signal. The device 704 thus sends data to the server, indicating that the strength of the signal received from the fourth signal emitting platform 702d was non-zero.

The server 706 analyzes the collected signal strength data and determines a general location of the device 704. That is, since the device 704 is within the signal range of both the third and fourth signal emitting devices 702c and 702d, the server 706 determines that the device 704 must be in a region of the localization area 708 where the two signals overlap. In this example, the region of overlap covers a single aisle 720 in the supermarket.

The server 706 determines, however, that more precision is desired in the localization of the device 704. The server 706 analyzes the stored locations of the signal emitting devices 702a-702e and determines that the fifth signal emitting device 702e is likely in fairly close proximity to the device 704, since the fifth signal emitting device is already in aisle 720.

Figure 11:
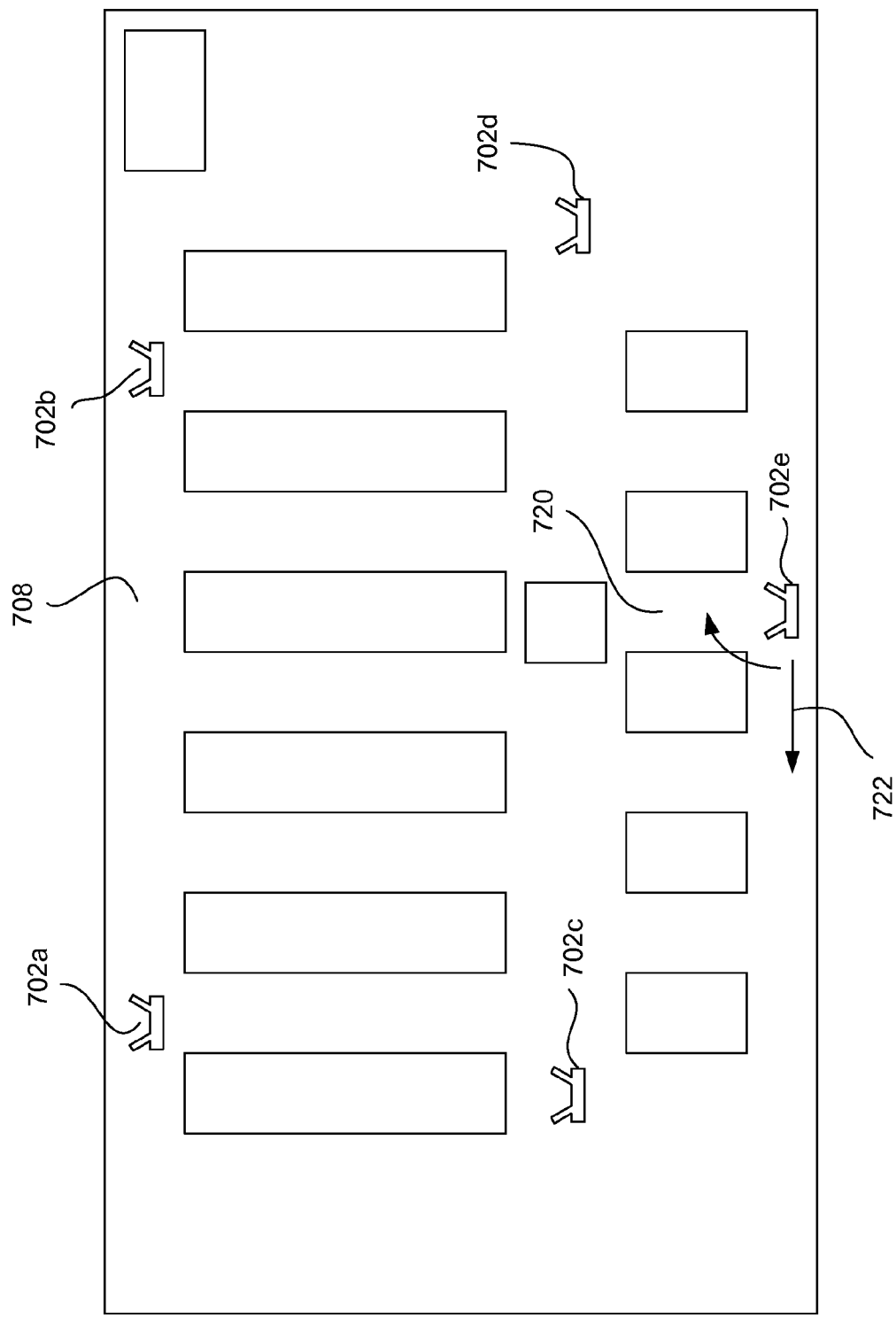

To obtain a quick confirmation that the device 704 is actually in the aisle 720, the server 706 determines that the fifth signal emitting platform 702e should orient a directional antenna down the aisle 720 and emit a signal. The server 706 determines, however, that the directional antenna on the fifth signal emitting platform 702e is currently facing the wrong way (i.e., towards direction 722 of FIG. 11). The server 706 thus sends a command to the fifth signal emitting platform 702e, which causes the fifth signal emitting platform 702e to rotate and/or reorient its directional antenna down the aisle 720, as shown in FIG. 11.

Figure 12:
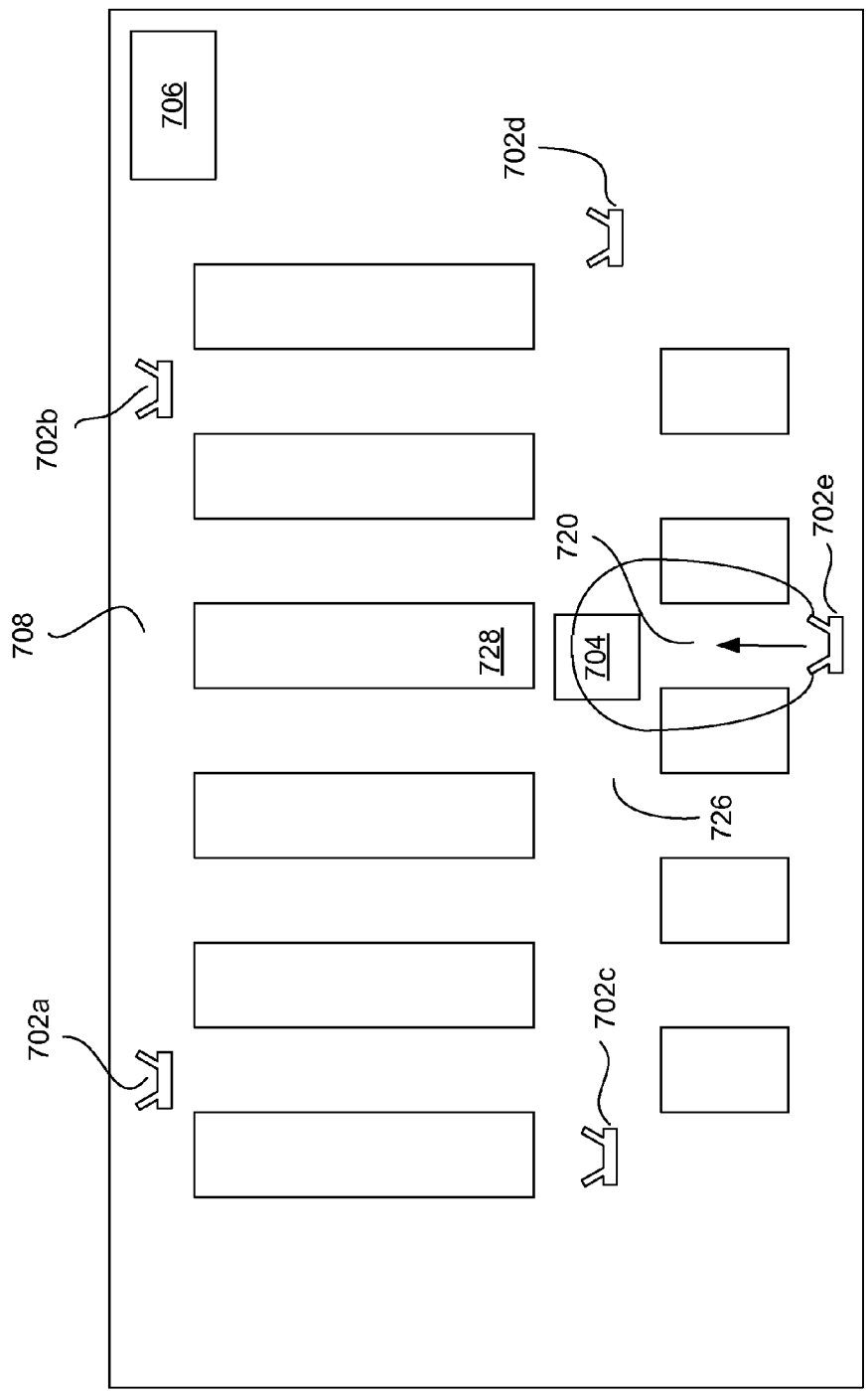

In response to the command, the fifth signal emitting platform 702e also transmits a signal down the aisle 720, as shown in FIG. 12. The server 706 then requests a signal strength assessment from the device 704. The device 704 receives the signal emitted from the fifth signal emitting device 702e, assesses the strength of the signal and transmits the signal strength data to the server 706 (e.g., as described in step 204 of FIG. 2.)

Also in response to the command, the fifth signal emitting platform 702e then moves down the aisle 720 a predetermined distance towards the device 704, as shown in FIG. 12.

After the move is completed, the fifth signal emitting platform 702e again emits or continues to emit a signal. The device 704 receives the signal, assesses the strength of the signal, and transmits the signal strength data to the server 706 (e.g., as described in step 212 of FIG. 2.)

The server 706 uses the signal strength data obtained before the move, the signal strength data obtained after the move, and any suitable information regarding the move (e.g., the distance and/or direction traveled, etc.) to determine the location of the device 704. By way of example, the server 706 may localize the device using any technique described in connection with step 216 of FIG. 2. In this example, the server 706 determines that the device is at the intersection of aisles 720 and 726 and near a display of breakfast cereal products on shelf 728.

Based on this location determination, the server 706 then transmits an advertisement to the device 704. The device 704 emits a sound and/or displays the advertisement on its screen or user interface unit 506. In this example, the advertisement indicates that a special deal is available today if particular brands of breakfast cereal on the shelf 728 are purchased.

Figure 13:
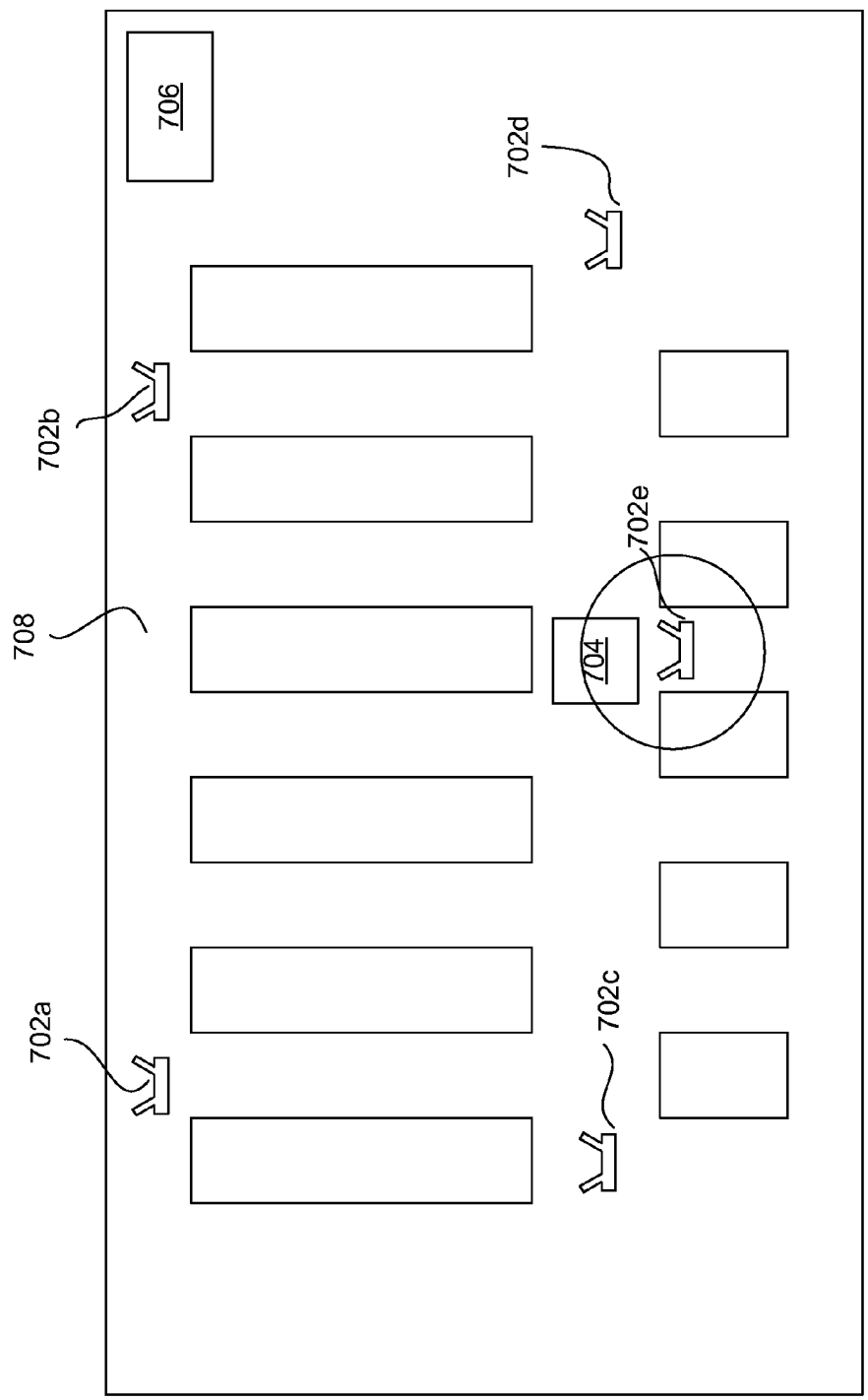

In some situations, it may be desirable to have even more precision in the localization process. In FIG. 13, for example, the server 706 transmits a command to the fifth signal emitting platform 702e to repeat some of the above operations, but while using a short-range signal emitted from an omnidirectional antenna. In some applications, shorter range signal types (e.g., Bluetooth) can be more accurate than longer-range ones (e.g., WiFi.) Thus, in response to the server command, the fifth signal emitting platform 702e performs the following steps: (1) discontinuing the use or activation of the directional antenna; (2) activate an omnidirectional antenna and use it to emit a different type of signal that has a shorter range than the one that was previously used in FIG. 12 (e.g., Bluetooth); (3) after the device 704 has received the signal and transmitted corresponding signal strength data to the server 706, move towards the device; (4) continue to emit the signal, so that the device 704 can again receive the signal and send signal strength data again to the server 706. The server then determines the location, possibly with greater precision, based on the movement, movement distance, and/or the signal strength data received before and after the movement (e.g., as discussed in connection with step 214 and 216 of FIG. 2.)

The above example demonstrates that the signal emitting platforms 702a-702e, server 706 and device 704 may be used in a wide variety of ways to determine the location of the device. In various applications, the localization process may involve moving platforms multiple times, using different types of signals, switching between different types of antennae and/or turning on and off particular antennae. It should be appreciated that the above example is meant only to be illustrative and exemplary and that a wide variety of other localization techniques may be employed. In the above example, the server 706 plays a role in determining the location of the device 704. However, it should be noted that the server 706 is not necessary and that in some embodiments, the device 704 performs some or all of the above operations that are performed by the server 706.

Figure 14:
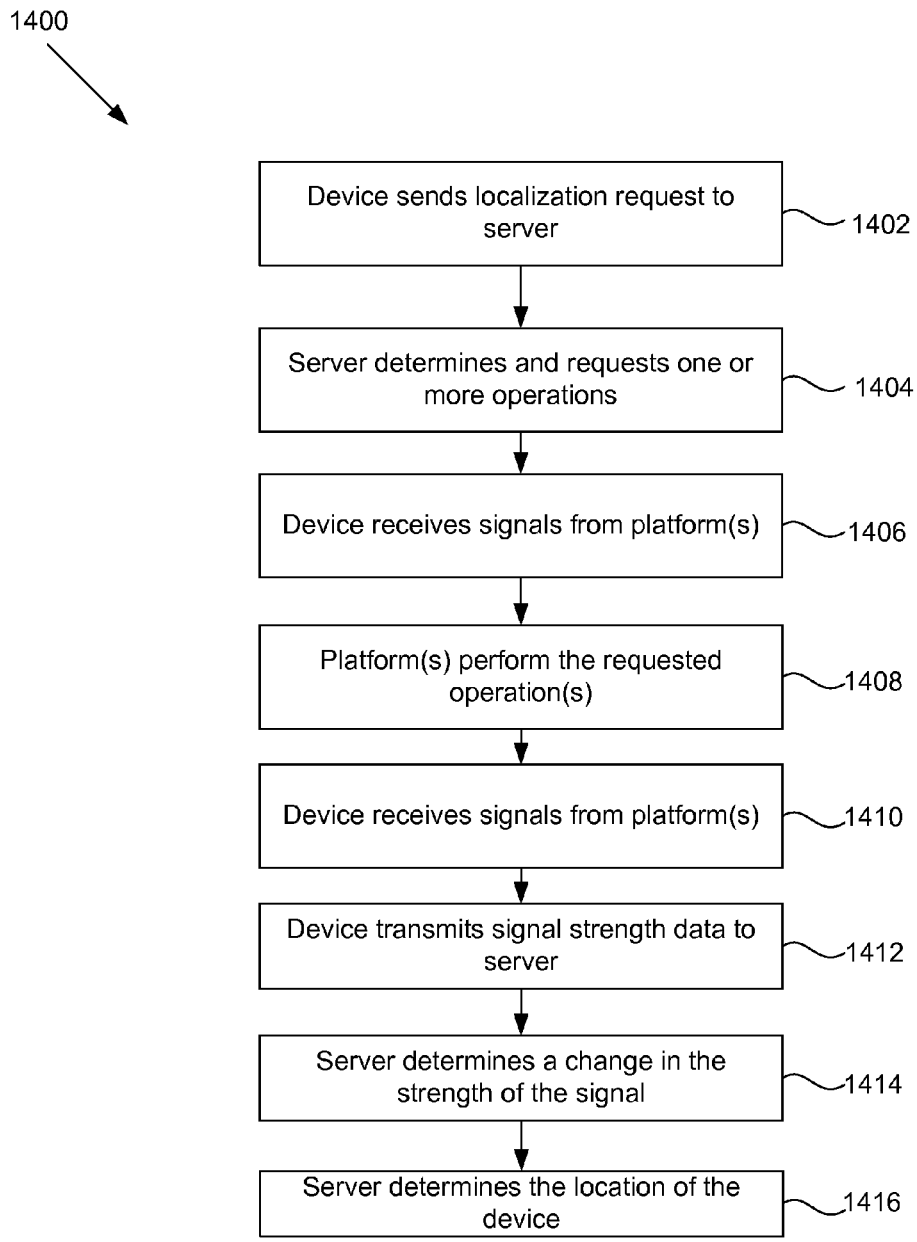
FIG. 14 is a flow diagram of a server-based method for determining a location of a device according to a particular embodiment of the present invention.

Referring next to FIG. 14, an example server-based method 1400 for determining the location of a device 104 is described. The method 1400 may be performed using the localization system 100 illustrated in FIG. 1. In the illustrated embodiment, the server 106 of FIG. 1, rather than the device 104, directs the operations performed by the signal emitting platforms 102a-102d and determines the location of the device 104.

Initially, at step 1402, the device 104 optionally transmits a localization request to the server 106. In response, the server 106 determines and requests one or more operations (step 1404.) These operations may be any of the platform operations described in this application, including any of the operations described in connection with steps 206 and 208 of FIG. 2. The server 106 transmits these requests to one or more signal emitting platforms 102a-102d. It should be noted that multiple platforms may receive requests for different operations.

At step 1406, the device 104 receives signals from the one or more signal emitting platforms (e.g., as in step 202 of FIG. 2). The platform(s) that received the requests then perform the requested operation(s) (step 1408). In some embodiments, for example, the platform(s) move, turn on or off particular directional antennae, adjust the type or strength of the signal, etc. At step 1410, the device again or continues to receive signals from the platform(s) (e.g., as in step 210 of FIG. 2.) The strength of the signals are now different at least in part because of the operations performed in step 1408.

The device 104 transmits data indicating the strength of the signals received in steps 1406 and 1410 to the server 106 (step 1412). At step 1414, the server 106 determines the change in the strength of the signals received before and after the operations were performed (e.g., as in step 214 of FIG. 2.) In some embodiments, step 1414 is performed by the device 104, and the signal strength change data is then transmitted to the server 106.

Based on the change in the strength of the signals and the requested operation(s), the server 106 then determines the location of the device 104. This location determination process may be performed using any technique described in connection with step 216 of FIG. 2.

Once the location of the device 104 is determined, it can be used in a variety of applications. In some embodiments, for example, the server 106 selects a particular notification or advertisement based on the location information and transmits the notification/advertisement to the device 104 so that it can be displayed to the device user. Any advertisement or notification system described in connection with step 218 of FIG. 2 may also be used.

Although only a few embodiments of the invention have been described in detail, it should be appreciated that the invention may be implemented in many other forms without departing from the spirit or scope of the invention. For example, the figures include block diagrams. Each block diagram refers to a variety of different components. It should be appreciated that the features and functionality of one component may be transferred to another and the number of components and their arrangement may be different from what is shown in the figures. Any component can be divided into multiple components, or two or more components may be combined. Additionally, the figures for the application illustrate methods with various steps. These steps may be modified or reordered. In some embodiments, particular steps are removed or new steps are added as appropriate. Therefore, the present embodiments should be considered illustrative and not restrictive and the invention is not to be limited to the details given herein.

The invention claimed is:

1. A method for determining location of a mobile device, the method comprising:

causing a plurality of signal emitting platforms to emit signals until a signal is detected at the mobile device, wherein the signals are emitted in sequence such that only one of the signal emitting platforms is emitting signals at any time;

when a signal is detected at the mobile device as a result of emission of a signal from a particular one of the signal emitting platforms, receiving a first signal data from the mobile device and causing the particular one of the signal emitting platforms to move in a particular direction;

receiving a second signal data after the particular one of the platforms has moved in the particular direction;

causing adjusting a strength of the signal emitted from the particular one of the platforms;

detecting a change in strength between the first received signal data and the second received signal data caused at least in part by the movement of the particular one of the platforms;

based at least in part on the change in the strength of the received signal data, determining a location of the mobile device; and transmitting a notification based at least in part on the determined location of the mobile device to the mobile device for displaying at a display of the mobile device.

2. The method of claim 1 further comprising causing changing a direction of a directional antenna on the particular one of the platforms.

3. The method of claim 1 further comprising causing changing a type of signal being emitted from the particular one of the platforms.

4. The method of claim 3 wherein the changing of the type of signal involves switching from a first type of signal to a second type of signal, the first and second types of signals being selected from the group consisting of Bluetooth, WiFi, FM radio, ultrasound and light.

5. The method of claim 1 further comprising causing selectively turning on or off an antenna on the particular one of the platforms.

6. The method of claim 1 further comprising causing the particular one of the platforms to move in a particular linear direction.

7. The method of claim 1 wherein during a time period in which the change in the strength of the received signal takes place, the mobile device remains stationary.

8. The method of claim 1, wherein the notification includes an advertisement.

9. The method of claim 8 wherein the determination of the location of the mobile device is performed without requiring fingerprinting wherein fingerprinting involves collecting signal strength data from a plurality of different locations before receipt of the first signal data from the mobile device.

10. A signal emitting platform of a plurality of signal emitting platforms that are arranged to help determine a location of a mobile device, the signal emitting platform comprising:

a signal emitting element, the signal emitting element arranged to emit a signal, when none of the other plurality of signal emitting platforms is emitting signal and in sequence with the other plurality of signal emitting platforms, that is received by the mobile device and used to determine a location of the mobile device so that a notification based at least in part on the determined location of the mobile device is transmitted to the mobile device for displaying at a display of the mobile device;

a movement element that helps physically move the signal emitting platform;

at least one processor; and at least one memory, the memory including a non-transitory computer readable storage medium stored in a tangible form, the non-transitory computer readable storage medium including executable computer code that, when executed by the at least one processor, causes the signal emitting platform to:

receive a request to perform a first operation wherein the first operation involves using the movement element to move the signal emitting platform in a particular direction, thereby causing a change in the strength of the signal received by the mobile device, and receive a request to perform a second operation wherein the second operation further involves using the signal emitting element to adjust a strength of the signal.

11. The signal emitting platform of claim 10 wherein the movement element involves one selected from the group consisting of (1) one or more wheels; (2) one or more tracks; (3) a structure that enables the signal emitting platform to roll; (4) a structure that enables the signal emitting platform to slide along a rail; and (5) a structure that enables the signal emitting platform to slide along a slot.

12. The signal emitting platform of claim 10 further comprises at least one selected from the group consisting of (1) a battery arranged to power the movement element; (2) a motor arranged to power the movement element; and (3) a electrical connector that receives electrical power from an external source and that is arranged to provide power to the movement element.

13. The signal emitting platform of claim 10 wherein the signal emitting element is arranged to emit at least two different signal types selected from the group consisting of Bluetooth, WiFi, FM radio, ultrasound and light.

14. The signal emitting platform of claim 13 wherein the signal emitting element is arranged to emit at least two different signal types and is further arranged to switch between different signal types in response to a request from the mobile device.

15. The signal emitting platform of claim 10 wherein the executable computer code, when executed by the at least one processor, further causes the signal emitting platform to:

receive a request for one or more other operations;

in response to the request, perform one or more other operations, the one or more other operations being selected from the group consisting of:
(1) an operation involving changing a direction of a directional antenna wherein the signal emitting element includes the directional antenna;
(2) an operation involving adjusting a strength of the signal emitted from the signal emitting element;
(3) an operation involving changing a type of signal being emitted from the signal emitting element; and
(4) an operation involving selectively turning on or off an antenna wherein the signal emitting element includes the antenna.

16. A non-transitory computer readable storage medium on a mobile device that includes executable computer code embodied in a tangible form operable to help determine a location of the mobile device wherein the non-transitory computer readable storage medium includes:

executable computer code operable to send to a server a first signal data of a first signal received from a signal emitting platform, wherein the signal emitting platform is one of a plurality of signal emitting platforms that emit signals in sequence such that only one of the plurality of signal emitting platforms is emitting signals at any time, and wherein the server causes the signal emitting platform to move in a particular direction and to adjust a strength of signal upon receipt of the first signal data;

executable computer code operable to send to the server a second signal data of a second signal received from the signal emitting platform after the signal emitting platform has moved in the particular direction for determining a location of the mobile device based at least in part on a change in strength between the first and second signal data, wherein the change in the strength is caused at least in part by the movement of the signal emitting platform; and executable computer code operable to display a notification, wherein the notification is transmitted from the server based at least in part on the determined location of the mobile device.

17. The computer readable medium of claim 16 further comprising:

executable computer code operable to transmit a request for one or more other operations selected from the group consisting of:
(1) an operation involving changing a direction of a directional antenna on the signal emitting platform;
(2) an operation involving adjusting a strength of the signal emitted from the signal emitting platform;
(3) an operation involving changing a type of signal being emitted from the signal emitting platform; and
(4) an operation involving selectively turning on or off an antennae on the signal emitting platform.

18. The computer readable storage medium of claim 16 further comprising:

executable computer code operable to transmit the determined location to an external server;

executable computer code operable to receive an advertisement from the server based on the determined location; and executable computer code operable to display the advertisement on a display of the mobile device.

19. The computer readable medium of claim 16 further comprising computer executable code, which assumes a mobile device is stationary wherein during a time period between receiving the first signal data and the second signal data.

20. The method of claim 16 wherein the determination of the location of the mobile device is performed without requiring fingerprinting wherein fingerprinting involves collecting signal strength data from a plurality of different locations before receipt of the first signal data from the mobile device.

* * * * *